(12) United States Patent
Saleh et al.

(10) Patent No.: US 7,729,290 B2
(45) Date of Patent: Jun. 1, 2010

(54) METHOD FOR ROUTING INFORMATION OVER A NETWORK EMPLOYING CENTRALIZED CONTROL

(75) Inventors: Ali N. Saleh, Ft. Lauderdale, FL (US); H. Michael Zadikian, McKinney, TX (US); Zareh Baghdasarian, La Canada, CA (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 34 days.

(21) Appl. No.: 11/877,577

(22) Filed: Oct. 23, 2007

(65) Prior Publication Data

US 2008/0037562 A1 Feb. 14, 2008

Related U.S. Application Data

(62) Division of application No. 11/290,261, filed on Nov. 30, 2005, now Pat. No. 7,286,490, which is a division of application No. 09/751,763, filed on Dec. 30, 2000, now Pat. No. 6,973,023.

(51) Int. Cl.
*H04L 12/28* (2006.01)
(52) U.S. Cl. .................................... 370/254; 370/351

(58) Field of Classification Search ................ None
See application file for complete search history.

(56) References Cited

U.S. PATENT DOCUMENTS

| | | | | | |
|---|---|---|---|---|---|
| 5,537,532 | A | * | 7/1996 | Chng et al. | 714/4 |
| 5,640,561 | A | * | 6/1997 | Satoh et al. | 707/202 |
| 6,069,895 | A | * | 5/2000 | Ayandeh | 370/399 |
| 6,178,172 | B1 | * | 1/2001 | Rochberger | 370/395.32 |
| 6,791,939 | B1 | * | 9/2004 | Steele et al. | 370/217 |
| 6,914,912 | B1 | * | 7/2005 | Skalecki et al. | 370/468 |
| 7,003,559 | B1 | * | 2/2006 | Nataraian et al. | 709/223 |
| 7,027,411 | B1 | * | 4/2006 | Pulsipher et al. | 370/254 |
| 7,342,893 | B2 | * | 3/2008 | Barkai et al. | 370/245 |
| 2002/0040393 | A1 | * | 4/2002 | Christensen | 709/224 |
| 2004/0059812 | A1 | * | 3/2004 | Assa | 709/224 |

\* cited by examiner

*Primary Examiner*—Min Jung
(74) *Attorney, Agent, or Firm*—Campbell Stephenson LLP; Samuel G. Campbell, III

(57) ABSTRACT

A method and apparatus for centralized control of a network is described. The network includes a number of nodes. The method includes creating a database and storing the database on a master node of the network. The database contains topology information regarding a topology of the network. Each of the nodes is coupled to at least one other of the nodes, with the master node being one of the nodes.

24 Claims, 29 Drawing Sheets

| NodeID | 1710 |
|---|---|
| LinkCost | 1720 |
| QoS3Capacity | 1730 |
| QoSnCapacity | 1740 |
| HelloInterval | 1750 |
| TimeoutInterval | 1760 |

| VPID | | 2010 |
|---|---|---|
| Checksum | | 2020 |
| PathLength  2030 | HopCount | 2040 |
| Hop | | 2060(1) |
| Hop | | 2060(2) |
| | | |
| Hop | | 2060(N) |

Path 2050

FIG. 20

|  |  |  |
|---|---|---|
| VPID |  | 2110 |
| Checksum |  | 2121 |
| PathLength 2130 | HopCount | 2140 |
| Hop |  | 2160(1) |
| Hop |  | 2160(2) |
|  |  |  |
| Hop |  | 2160(N) |

2100

Path 2150

FIG. 21

METHOD FOR ROUTING INFORMATION OVER A NETWORK EMPLOYING CENTRALIZED CONTROL

CROSS-REFERENCES TO RELATED APPLICATIONS

This application is a divisional of U.S. patent application Ser. No. 11/290,261 filed Nov. 30, 2005, now U.S. Pat. No. 7,286,490, entitled "A Method for Routing Information over a Network Employing Centralized Control," issued on Oct. 23, 2007, and naming Ali N. Saleh, H. Michael Zadikian, Zareh Baghdasarian and Vahid Parsi as inventors, which is a divisional of application Ser. No. 09/751,763 filed Dec. 30, 2000, now U.S. Pat. No. 6,973,023, entitled "A Method for Routing Information over a Network Employing Centralized Control," issued on Dec. 6, 2005, and naming Ali N. Saleh, H. Michael Zadikian, Zareh Baghdasarian and Vahid Parsi as inventors, which in turn, is related to U.S. Pat. No. 6,856,627, issued on Feb. 15, 2005, entitled "A METHOD FOR ROUTING INFORMATION OVER A NETWORK," and U.S. Pat. No. 6,724,757, issued on Apr. 20, 2004, entitled "A CONFIGURABLE NETWORK ROUTER." These applications are hereby incorporated by reference, in their entirety and for all purposes.

BACKGROUND OF THE INVENTION

1. Field of the Invention

This invention relates to the field of information networks, and more particularly relates to a protocol for configuring routes over a network.

2. Description of the Related Art

Today's networks carry vast amounts of information. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols employing an optical infrastructure. SONET is a physical transmission vehicle capable of transmission speeds in the multi-gigabit range, and is defined by a set of electrical as well as optical standards. SONET's ability to use currently-installed fiber optic cabling, coupled with the fact that SONET significantly reduces complexity and equipment functionality requirements, gives local and interexchange carriers incentive to employ SONET. Also attractive is the immediate savings in operational cost that this reduction in complexity provides. SONET thus allows the realization of a new generation of high-bandwidth services in a more economical manner than previously existed.

SONET networks have traditionally been protected from failures by using topologies that dedicate something on the order of half the network's available bandwidth for protection, such as a ring topology. Two approaches in common use today are diverse protection and self-healing rings (SHR), both of which offer relatively fast restoration times with relatively simple control logic, but do not scale well for large data networks. This is mostly due to their inefficiency in capacity allocation. Their fast restoration time, however, makes most failures transparent to the end-user, which is important in applications such as telephony and other voice communications. The existing schemes rely on 1-plus-1 and 1-for-1 topologies that carry active traffic over two separate fibers (line switched) or signals (path switched), and use a protocol (Automatic Protection Switching or APS), or hardware (diverse protection) to detect, propagate, and restore failures.

A SONET network using an SHR topology provides very fast restoration of failed links by using redundant links between the nodes of each ring. Thus, each ring actually consists of two rings, a ring supporting information transfer in a "clockwise" direction and a ring supporting information transfer in a "counter-clockwise" direction. The terms "east" and "west" are also commonly used in this regard. Each direction employs its own set of fiber optic cables, with traffic between nodes assigned a certain direction (either clockwise or counter clockwise). If a cable in one of these sub-rings is damaged, the SONET ring "heals" itself by changing the direction of information flow from the direction taken by the information transferred over the failed link to the sub-ring having information flow in the opposite direction.

The detection of such faults and the restoration of information flow thus occurs very quickly, on the order of 10 ms (for detection) and 50 ms (for restoration) for most ring implementations. The short restoration time is critical in supporting applications, such as current telephone networks, that are sensitive to quality of service (QoS) because such short restoration times prevent old digital terminals and switches from generating red alarms and initiating Carrier Group Alarms (CGA). These alarms are undesirable because such alarms usually result in dropped calls, causing users down time aggravation. Restoration times that exceed 10 seconds can lead to timeouts at higher protocol layers, while those that exceed 1 minute can lead to disastrous results for the entire network. However, the price of such quickly restored information flow is the high bandwidth requirements of such systems. By maintaining completely redundant sub-rings, an SHR topology requires 100% excess bandwidth.

An alternative to the ring topology is the mesh topology. The mesh topology is similar to the point-to-point topology used in inter-networking. Each node in such a network is connected to one or more other nodes. Thus, each node is connected to the rest of the network by one or more links. In this manner, a path from a first node to a second node uses all or a portion of the capacity of the links between those two nodes.

Networks based on mesh-type restoration are inherently more capacity-efficient than ring-based designs, mainly because each network link can potentially provide protection for fiber cuts on several different links. By sharing the capacity between links, a SONET network using a mesh topology can provide redundancy for failure restoration at less than 100% of the bandwidth capacity originally required. Such networks are even more efficient when traffic transits several links. However, restoration times exhibited by such approaches range from several minutes to several months.

SUMMARY OF THE INVENTION

Embodiments of the present invention provide a centralized routing protocol that supports relatively simple provisioning and relatively fast restoration (on the order of, for example, 50 ms), while providing relatively efficient bandwidth usage (i.e., minimizing excess bandwidth requirements for restoration, on the order of less than 100% redundant capacity and preferably less than 50% redundant capacity). Such a centralized routing protocol is, in certain embodiments, easily scaled to accommodate increasing bandwidth requirements.

According to embodiments of the present invention, an apparatus and method are described for configuring routes over a network. Such a method, embodied in a protocol according to embodiments of the present invention, provides several advantages, including relatively fast restoration (on the order of, for example, 50 ms) and relatively efficient bandwidth usage (i.e., on the order of less than 100% redundant capacity and preferably less than 50% redundant capacity).

In one embodiment of the present invention, a network is described. The network includes a master node. The network includes a number of nodes, and each of the nodes is coupled to at least one other of the nodes, with the master node being one of the nodes. The master node maintains topology information regarding a topology of the network.

In one aspect of the embodiment, the network includes a backup node, which is one of the nodes of the network. Such a backup node maintains a redundant copy of the topology information.

In another embodiment of the present invention, a method for centralized control of a network is described. The network includes a number of nodes. The method includes creating a database and storing the database on a master node of the network. The database contains topology information regarding a topology of the network. Each of the nodes is coupled to at least one other of the nodes, with the master node being one of the nodes.

In one aspect of the embodiment, the method further includes retrieving backup topology information from a backup node with the backup node is one of the nodes. The backup node maintains a redundant copy of the topology information as the backup topology information. Moreover, the master node and the backup node can be maintain synchronization of the database and the backup topology information.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 20 illustrates the layout of a GET_LSA Packet.

FIG. 21 illustrates the layout of a CREATE_PATH Packet.

DETAILED DESCRIPTION

Figure 1:
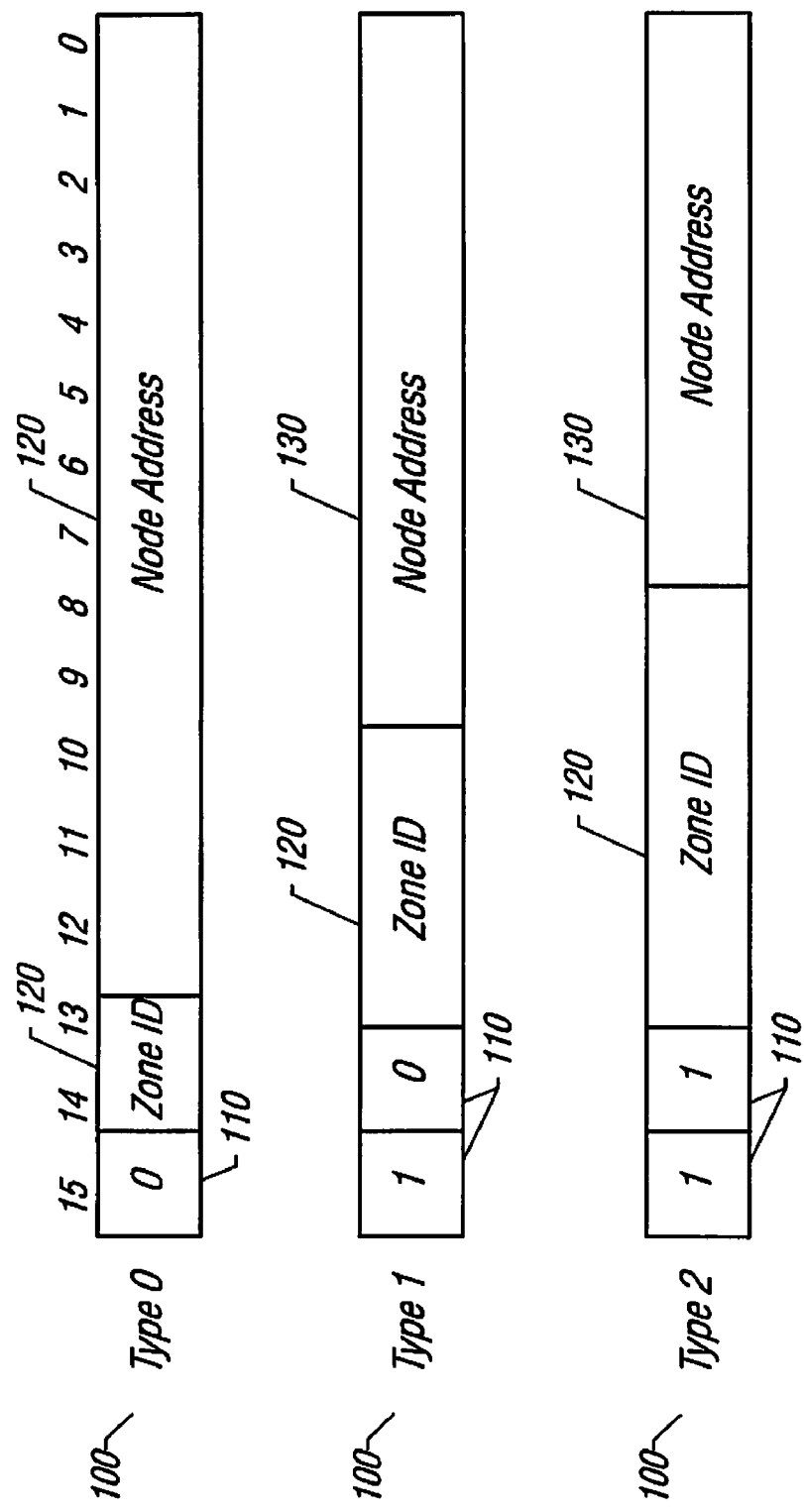
FIG. 1 illustrates the layout of a Node Identifier.

The following is intended to provide a detailed description of an example of the invention and should not be taken to be limiting of the invention itself. Rather, any number of variations may fall within the scope of the invention which is defined in the claims following the description.

Network Architecture

To limit the size of the topology database and the scope of broadcast packets, networks employing an embodiment of the protocol described herein can be divided into smaller logical groups referred to herein as "zones." Each zone runs a separate copy of the topology distribution algorithm, and nodes within each zone are only required to maintain information about their own zone. There is no need for a zone's topology to be known outside its boundaries, and nodes within a zone need not be aware of the network's topology external to their respective zones.

Nodes that attach to multiple zones are referred to herein as border nodes. Border nodes are required to maintain a separate topological database, also called link-state or connectivity database, for each of the zones they attach to. Border nodes use the connectivity database(s) for intra-zone routing. Border nodes are also required to maintain a separate database that describes the connectivity of the zones themselves. This database, which is called the network database, is used for inter-zone routing. The network database describes the topology of a special zone, referred to herein as the backbone, which is always assigned an identifier (ID) of 0. The backbone has all the characteristics of a zone. There is no need for a backbone's topology to be known outside the backbone, and its border nodes need not be aware of the topologies of other zones.

A network is referred to herein as flat if the network consists of a single zone (i.e., zone 0 or the backbone zone). Conversely, a network is referred to herein as hierarchical if the network contains two or more zones, not including the backbone. The resulting multi-level hierarchy (i.e., nodes and one or more zones) provides the following benefits:

1. The size of the link state database maintained by each network node is reduced, which allows the protocol to scale well for large networks.

2. The scope of broadcast packets is limited, reducing their impact.

Broadcast packets impact bandwidth by spawning offspring exponentially—the smaller scope results in a fewer number of hops and, therefore, less traffic.

The shorter average distance between nodes also results in a much faster restoration time, especially in large networks (which are more effectively divided into zones).

3. Different sections of a long route (i.e., one spanning multiple zones) can be computed separately and in parallel, speeding the calculations.

4. Restricting routing to be within a zone prevents database corruption in one zone from affecting the intra-zone routing capability of other zones because routing within a zone is based solely on information maintained within the zone.

As noted, the protocol routes information at two different levels: inter-zone and intra-zone. The former is only used when the source and destination nodes of a virtual path are located in different zones. Inter-zone routing supports path restoration on an end-to-end basis from the source of the virtual path to the destination by isolating failures between zones. In the latter case, the border nodes in each transit zone originate and terminate the path-restoration request on behalf of the virtual path's source and destination nodes. A border node that assumes the role of a source (or destination) node during the path restoration activity is referred to herein as a proxy source (destination) node. Such nodes are responsible for originating (terminating) the restore path request (RPR) with their own zones. Proxy nodes are also required to communicate with border nodes in other zones to establish an inter-zone path for the VP.

In one embodiment, every node in a network employing the protocol is assigned a globally unique 16-bit ID referred to herein as the node ID. A node ID is divided into two parts, zone ID and node address. Logically, each node ID is a pair (zone ID, node address), where the zone ID identifies a zone within the network, and the node address identifies a node within that zone. To minimize overhead, the protocol defines three types of node IDs, each with a different size zone ID field, although a different number of zone types can be employed. The network provider selects which packet type to use based on the desired network architecture.

FIG. 1 illustrates the layout of a node ID 100 using three types of node IDs. As shown in FIG. 1, a field referred to herein as type ID 110 is allocated either one or two bits, a zone ID 120 of between 2-6 bits in length, and a node address 130 of between about 8-13 bits in length. Type 0 IDs allocate 2 bits to zone ID and 13 bits to node address, which allows up to $2^{13}$ or 8192 nodes per zone. As shown in FIG. 1, type 1 IDs devote 4 bits to zone ID and 10 bits to node address, which allows up to $2^{10}$ (i.e. 1024) nodes to be placed in each zone. Finally, type 2 IDs use a 6-bit zone ID and an 8-bit node address, as shown in FIG. 1. This allows up to 256 nodes to be addressed within the zone. It will be obvious to one skilled in the art that the node ID bits can be apportioned in several other ways to provide more levels of addressing.

Type 0 IDs work well for networks that contain a small number of large zones (e.g., less than about 4 zones). Type 2 IDs are well suited for networks that contain a large number of small zones (e.g., more than about 15). Type 1 IDs provide a good compromise between zone size and number of available zones, which makes a type 1 node ID a good choice for networks that contain an average number of medium size zones (e.g., between about 4 and about 15). When zones being described herein are in a network, the node IDs of the nodes in a zone may be delineated as two decimal numbers separated by a period (e.g., ZoneID.NodeAddress).

Figure 2:
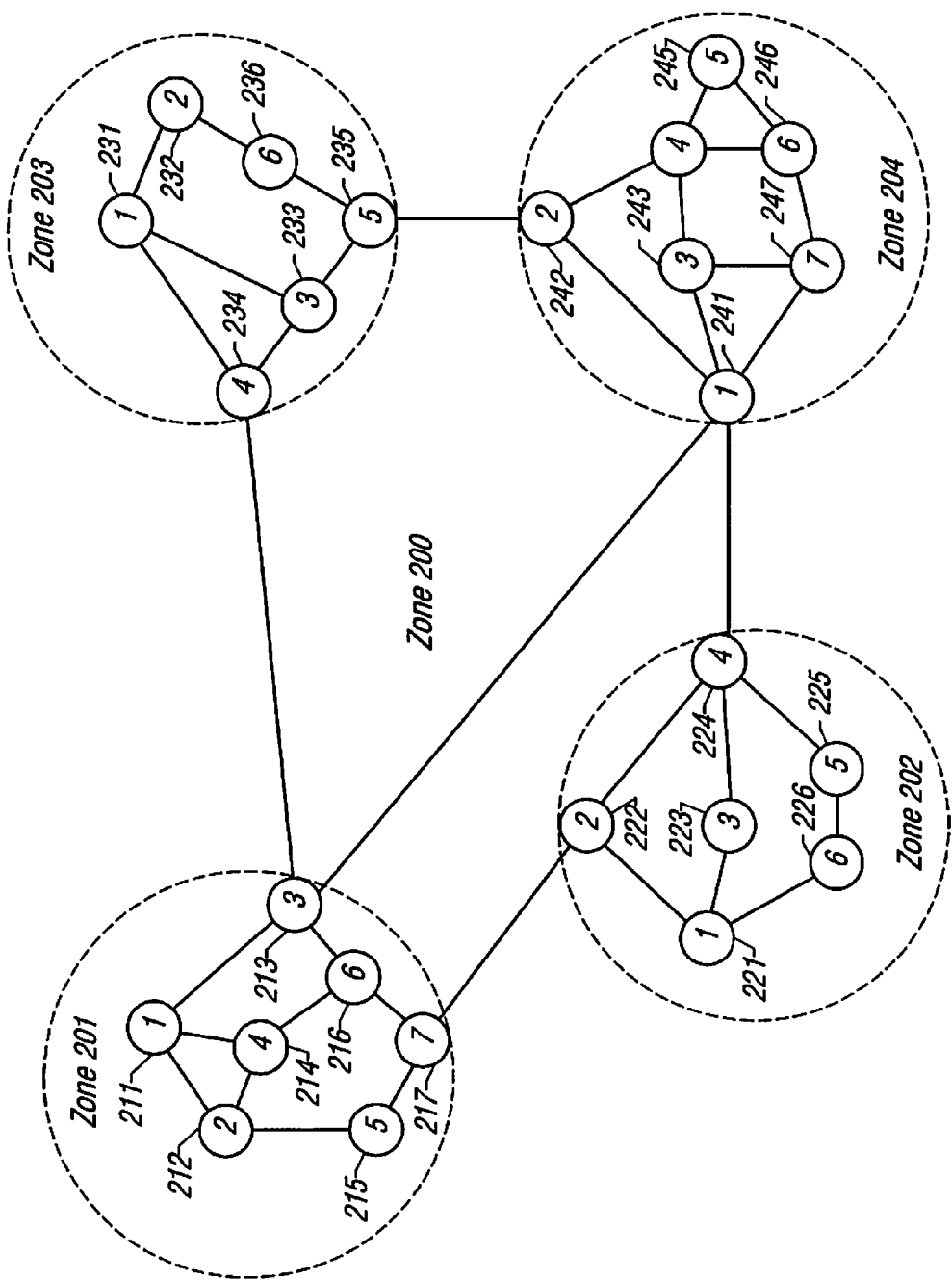
FIG. 2 is a block diagram of a zoned network consisting of four zones and a backbone.

FIG. 2 illustrates an exemplary network that has been organized into a backbone, zone 200, and four configured zones, zones 201-204, which are numbered 0-4 under the protocol, respectively. The exemplary network employs a type 0 node ID, as there are relatively few zones (4). The solid circles in each zone represent network nodes, while the numbers within the circles represent node addresses, and include network nodes 211-217, 221-226, 231-236, and 241-247. The dashed circles represent network zones. The network depicted in FIG. 2 has four configured zones (zones 1-4) and one backbone (zone 0). Nodes with node IDs 1.3, 1.7, 2.2, 2.4, 3.4, 3.5, 4.1, and 4.2 (network nodes 213, 217, 222, 224, 234, 235, 241, and 242, respectively) are border nodes because they connect to more than one zone. All other nodes are interior nodes because their links attach only to nodes within the same zone. Backbone 200 consists of 4 nodes, zones 201-204, with node IDs of 0.1, 0.2, 0.3, and 0.4, respectively.

Once a network topology has been defined, the protocol allows the user to configure one or more end-to-end connections that can span multiple nodes and zones. This operation is referred to herein as provisioning. Each set of physical connections that are provisioned creates an end-to-end connection between the two end nodes that supports a virtual point-to-point link (referred to herein as a virtual path or VP). The resulting VP has an associated capacity and an operational state, among other attributes. The end points of a VP can be configured to have a master/slave relationship. The terms source and destination are also used herein in referring to the two end-nodes. In such a relationship, the node with a numerically lower node ID assumes the role of the master (or source) node, while the other assumes the role of the slave (or destination) node. The protocol defines a convention in which the source node initiates recovery under the control of a master node (described subsequently) and that the destination node simply waits for a message from the source node informing the source node of the VP's new path, although the opposite convention could easily be employed.

VPs are also assigned a priority level, which determines their relative priority within the network. This quality of service (QoS) parameter is used during failure recovery procedures to determine which VPs are first to be restored. Four QoS levels (0-3) are nominally defined in the protocol, with 0 being the lowest, although a larger or smaller number of QoS levels can be used. Provisioning is discussed in greater detail subsequently herein.

Initialization of Network Nodes

In one embodiment, network nodes use a protocol such as that referred to herein as the Hello Protocol in order to establish and maintain neighbor relationships, and to learn and distribute link state information throughout the network. The protocol relies on the periodic exchange of bi-directional packets (Hello packets) between neighbors. During the adjacency establishment phase of the protocol, which involves the exchange of INIT packets, nodes learn information about their neighbors, such as that listed in Table 1.

TABLE 1

Information regarding neighbors stored by a node.

| Parameter | Usage |
| --- | --- |
| Node ID | Node ID of the sending node, which is preferably from 8 bits to 32 bits. |
| HelloInterval | How often Hello packets should be sent by the receiving node |
| HelloDeadInterval | The time interval, in seconds, after which the sending node will consider its neighbor dead if a valid Hello packets is not received. |
| LinkCost | Cost of the link between the two neighbors. This may represent distance, delay or any other metric. |
| LinkCapacity | Total link capacity |
| QoS3Capacity | Link capacity reserved for QoS 3 connections |
| QoSnCapacity | Link capacity reserved for QoS 0-2 connections |

During normal protocol operation, each node constructs a structure known as a Link State Advertisement (LSA), which contains a list of the node's neighbors, links, the capacity of those links, the quality of service available on over links, one or more costs associated with each of the links, and other pertinent information. The node that constructs the LSA is called the originating node. Normally, the originating node is the only node allowed to modify its contents (except for the HOP_COUNT field, which is not included in the checksum and so may be modified by other nodes). The originating node retransmits the LSA when the LSA's contents change. The LSA is sent in a special Hello packet that contains not only the node's own LSA in its advertisement, but also ones received from other nodes. The structure, field definitions, and related information are illustrated subsequently in FIG. 18 and described in the corresponding discussion. Each node stores the most recently generated instance of an LSA in its database. The list of stored LSAs gives the node a complete topological map of the network. The topology database maintained by a given node is, therefore, nothing more than a list of the most recent LSAs generated by its peers and received in Hello packets.

In the case of a stable network, the majority of transmitted Hello packets are empty (i.e., contain no topology information) because only altered LSAs are included in the Hello messages. Packets containing no changes (no LSAs) are referred to herein as null Hello packets. The Hello protocol requires neighbors to exchange null Hello packets periodically. The HelloInterval parameter defines the duration of this period. Such packets ensure that the two neighbors are alive, and that the link that connects them is operational.

Initialization Message

An INIT message is the first protocol transaction conducted between adjacent nodes, and is performed upon network startup or when a node is added to a pre-existing network. An INIT message is used by adjacent nodes to initialize and exchange adjacency parameters. The packet contains parameters that identify the neighbor (the node ID of the sending node), its link bandwidth (both total and available, on a QoS3/QoSn basis), and its configured Hello protocol parameters. The structure, field definitions, and related information are illustrated subsequently in FIG. 17 and described in the text corresponding thereto.

In systems that provide two or more QoS levels, varying amounts of link bandwidth may be set aside for the exclusive use of services requiring a given QoS. For example, a certain amount of link bandwidth may be reserved for QoS3 connections. This guarantees that a given amount of link bandwidth will be available for use by these high-priority services. The remaining link bandwidth would then be available for use by all QoS levels (0-3). The Hello parameters include the HelloInterval and HelloDeadInterval parameters. The HelloInterval is the number of seconds between transmissions of Hello packets. A zero in this field indicates that this parameter hasn't been configured on the sending node and that the neighbor should use its own configured interval. If both nodes send a zero in this field then a default value (e.g., 7 seconds) preferably used. The HelloDeadInterval is the number of seconds the sending node will wait before declaring a silent neighbor down. A zero in this field indicates that this parameter hasn't been configured on the sending node and that the neighbor should use its own configured value. If both nodes send a zero in this field then a default value (e.g., 30 seconds) should be used. The successful receipt and processing of an INIT packet causes a START event to be sent to the Hello State machine, as is described subsequently.

Hello Message

Once adjacency between two neighbors has been established, the nodes periodically exchange Hello packets. The interval between these transmissions is a configurable parameter that can be different for each link, and for each direction. Nodes are expected to use the HelloInterval parameters specified in their neighbor's Hello message. A neighbor is considered dead if no Hello message is received from the neighbor within the HelloDeadInterval period (also a configurable parameter that can be link-and direction-specific).

In one embodiment, nodes in a network continuously receive Hello messages on each of their links and save the most recent LSAs from each message. Each LSA contains, among other things, an LSID (indicating which instance of the given LSA has been received) and a HOP_COUNT. The HOP_COUNT specifies the distance, as a number of hops, between the originating node and the receiving node. The originating node always sets this field of 0 when the LSA is created. The HOP_COUNT field is incremented by one for each hop (from node to node) traversed by the LSA instance. The HOP_COUNT field is set to zero by the originating node and is incremented by one on every hop of the flooding procedure. The ID field is initialized to FIRST_LSID during node start-up and is incremented every time a new instance of the LSA is created by the originating node. The initial ID is only used once by each originating node. Preferably, an LSA carrying such an ID is always accepted as most recent. This approach allows old instances of an LSA to be quickly flushed from the network when the originating node is restarted.

During normal network operation, the originating node of an LSA transmits LS update messages when the node detects activity that results in a change in its LSA. The node sets the HOP_COUNT field of the LSA to 0 and the LSID field to the LSID of the previous instance plus 1. Wraparound may be avoided by using a sufficiently-large LSID (e.g., 32 bits). When another node receives the update message, the node records the LSA in its database and schedules the LSA for transmission to its own neighbors. The HOP_COUNT field is incremented by one node and transmitted to the neighboring nodes. Likewise, when the nodes downstream of the current node receive an update message with a HOP_COUNT of H, they transmit their own update message to all of their neighbors with a HOP_COUNT of H+1, which represents the distance (in hops) to the originating node. This continues until the update message either reaches a node that has a newer instance of the LSA in its database or the hop-count field reaches MAX_HOPS.

Figure 3:
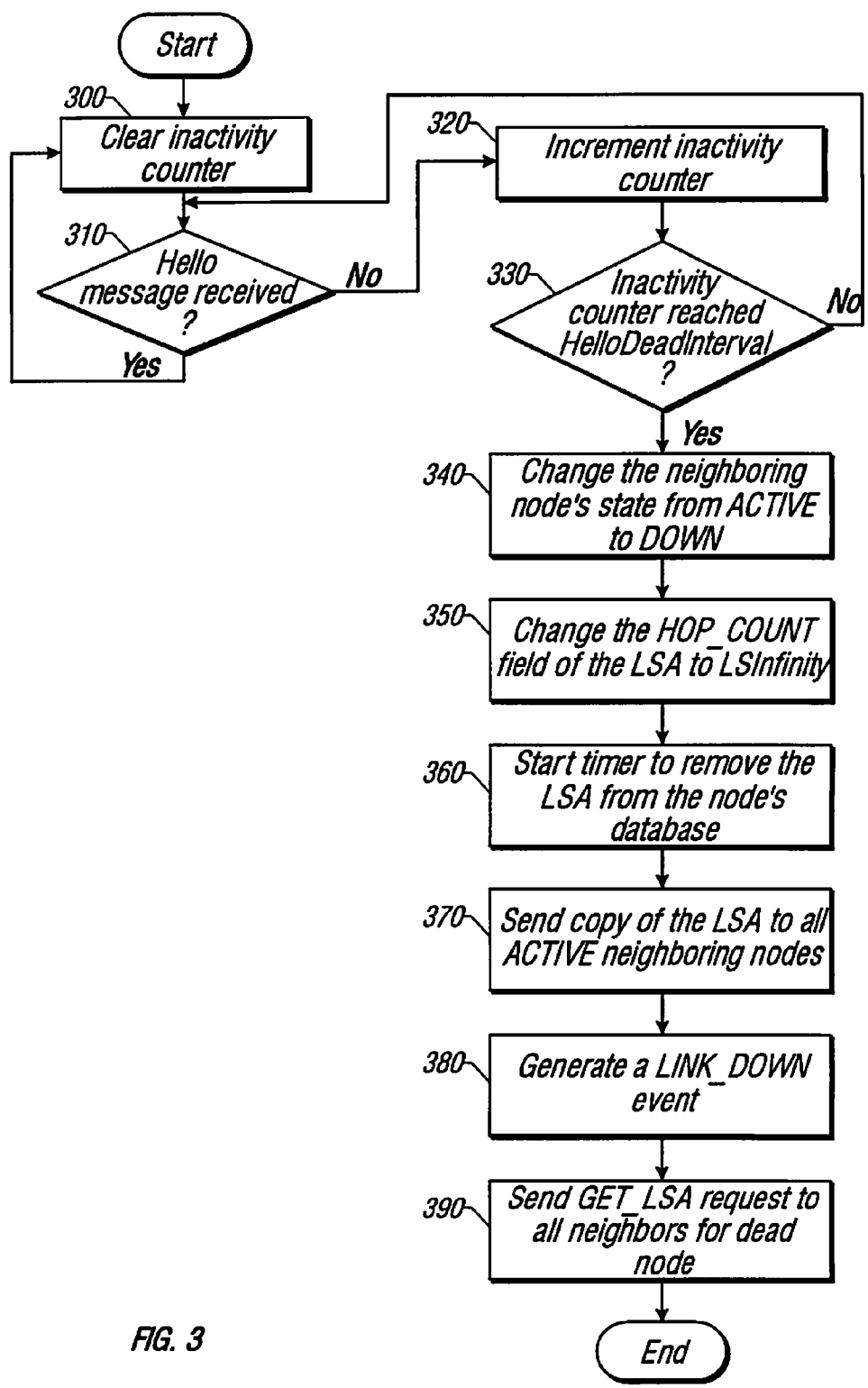
FIG. 3 is a flow diagram illustrating the actions performed by a neighboring node in the event of a failure.

FIG. 3 is a flow diagram illustrating the actions performed in the event of a failure. When the connection is created, the inactivity counter associated with the neighboring node is cleared (step 300). When a node receives a Hello message (null or otherwise) from a neighboring node (step 310), the receiving node clears the inactivity counter (step 300). If the neighboring node fails, or any component along the path between the node and the neighboring node fails, the receiving node stops receiving update messages from the neighboring node. This causes the inactivity counter to increase gradually (step 320) until the inactivity counter reaches HelloDeadInterval (step 330). Once HelloDeadInterval is reached, several actions are taken. First, the node changes the state of the neighboring node from ACTIVE to DOWN (step 340). Next, the HOP_COUNT field of the LSA is set to LSInfinity (step 350). A timer is then started to remove the LSA from the node's link state database within LSZombieTime (step 360). A copy of the LSA is then sent to all active neighbors (step 370). Next, a LINK_DOWN event is generated to cause all VP's that use the link between the node and its neighbor to be restored (step 380). Finally, a GET_LSA request is sent to all neighbors, requesting their copy of all LSA's previously received from the now-dead neighbor (step 390).

Those skilled in the art will recognize the boundaries between and order of operations in this and the other flow diagrams described herein are merely illustrative and alternative embodiments may merge operations, impose an alternative decomposition of functionality of operations, or re-order the operations presented therein. For example, the operations discussed herein may be decomposed into sub-operations to be executed as multiple computer processes. Moreover, alternative embodiments may combine multiple instances of particular operation or sub-operations. Furthermore, those skilled in the art will recognize that the operations described in this exemplary embodiment are for illustration only. Operations may be combined or the functionality of the operations may be distributed in additional operations in accordance with the invention.

The operations referred to herein may be modules or portions of modules (e.g., software, firmware or hardware modules). For example, although the described embodiment is generally discussed in terms of software modules and/or manually entered user commands, such actions may be embodied in the structure of circuitry that implements such functionality, such as the micro-code of a complex instruction set computer (CISC), firmware programmed into programmable or erasable/programmable devices (e.g., EPROMs), the configuration of a field-programmable gate array (FPGA), the design of a gate array or full-custom application-specific integrated circuit (ASIC), or the like.

The software modules discussed herein may include modules coded in a high-level programming language (e.g., the "C" programming language), script, batch or other executable files, or combinations and/or portions of such files. While it is appreciated that operations discussed herein may consist of directly entered commands by a computer system user or by steps executed by application specific hardware modules, the preferred embodiment includes steps executed by software modules. The functionality of steps referred to herein may correspond to the functionality of modules or portions of modules. The software modules may include a computer program or subroutines thereof encoded on computer-readable media.

Each of the blocks of FIG. 3 may thus be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Those software modules may therefore be received (e.g. from one or more computer readable media) by the various hardware modules of a router such as that described in the Patent Application entitled "A CONFIGURABLE NETWORK ROUTER," having A. Saleh, H. M. Zadikian, J. C. Adler, Z. Baghdasarian, and V. Parsi as inventors, as previously incorporated by reference herein. The computer readable media may be permanently, removably or remotely coupled to the given hardware module. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 4:
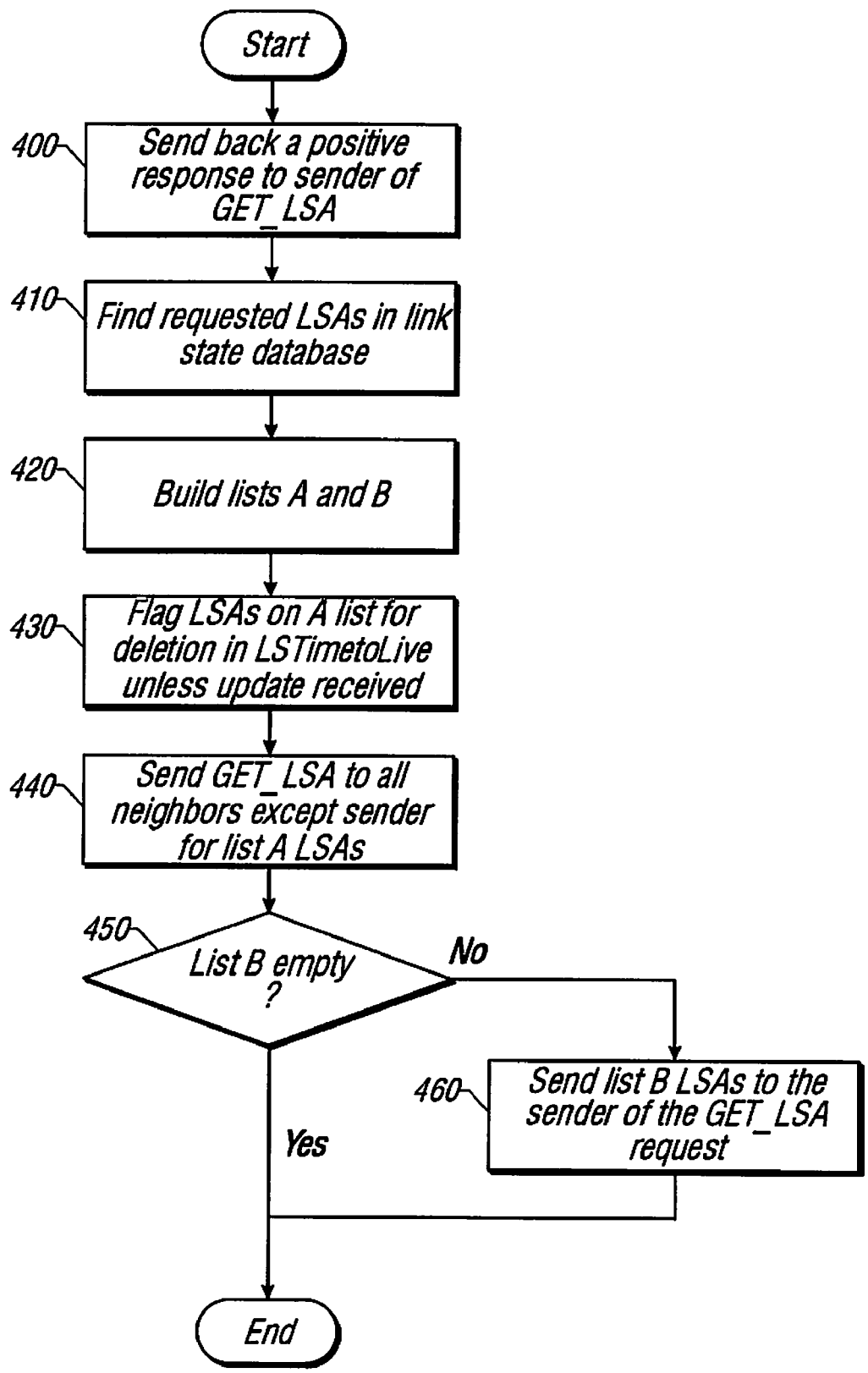
FIG. 4 is a flow diagram illustrating the actions performed by a downstream node in the event of a failure.

FIG. 4 is a flow diagram illustrating the actions performed when a downstream node receives a GET_LSA message. When the downstream node receives the request, the downstream node first acknowledges the request by sending back a positive response to the sending node (step 400). The downstream node then looks up the requested LSA's in its link state database (step 410) and builds two lists, list A and list B (step 420). The first list, list A, contains entries that were received from the sender of the GET_LSA request. The second list, list B, contains entries that were received from a node other than the sender of the request, and so need to be forwarded to the sender of the GET_LSA message. All entries on list A are flagged to be deleted within LSTimeToLive, unless an update is received from neighboring nodes prior to that time (step 430). The downstream node also sends a GET_LSA request to all neighbors, except the one from which the GET_LSA message was received, requesting each neighbor's version of the LSAs on list A (step 430). If list B is non-empty (step 450), entries on list B are placed in one or more Hello packets and sent to the sender of the GET_LSA message (step 460). No such request is generated if the list is empty (step 450).

The LSA of the inactive node propagates throughout the network until the hop-count reaches MAX_HOPS. Various versions of the GET_LSA request are generated by nodes along the path, each with a varying number of requested LSA entries. An entry is removed from the request when the request reaches a node that has an instance of the requested LSA that meets the criteria of list B.

All database exchanges are expected to be reliable using the above method because received LSA's must be individually acknowledged. The acknowledgment packet contains a mask that has a "1" in all bit positions that correspond to LSA's that were received without any errors. The low-order bit corresponds to the first LSA received in the request, while the high-order bit corresponds to the last LSA. Upon receiving the response, the sender verifies the checksum of all LSA's in its database that have a corresponding "0" bit in the response. The sender then retransmits all LSA's with a valid checksum and ages out all others. An incorrect checksum indicates that the contents of the given LSA has changed while being held in the node's database. This is usually the result of a memory problem. Each node is thus required to verify the checksum of all LSA's in its database periodically.

The LS checksum is provided to ensure the integrity of LSA contents. As noted, the LS checksum is used to detect data corruption of an LSA. This corruption can occur while the advertisement is being transmitted, while the advertisement is being held in a node's database, or at other points in the networking equipment. The checksum can be formed by any one of a number of methods known to those of skill in the art, such as by treating the LSA as a sequence of 16-bit integers, adding them together using one's complement arithmetic, and then taking the one's complement of the result. Preferably, the checksum doesn't include the LSA's HOP_COUNT field, in order to allow other nodes to modify the HOP_COUNT without having to update the checksum field. In such a scenario, only the originating node is allowed to modify the contents of an LSA except for those two fields, including its checksum. This simplifies the detection and tracking of data corruption.

Specific instances of an LSA are identified by the LSA's ID field, the LSID. The LSID makes possible the detection of old and duplicate LSAs. Similar to sequence numbers, the space created by the ID is circular: a sequence number starts at some value (FIRST_LSID), increases to some maximum value (FIRST_LSID−1), and then goes back to FIRST_LSID+1. Preferably, the initial value is only used once during the lifetime of the LSA, which helps flush old instances of the LSA quickly from the network when the originating node is restarted. Given a large enough LSID, wrap-around will never occur, in a practical sense. For example, using a 32 bit LSID and a MinLSInterval of 5 seconds, wrap-around takes on the order of 680 years.

LSIDs must be such that two LSIDs can be compared and the greater (or lesser) of the two identified, or a failure of the comparison indicated. Given two LSIDs x and y, x is considered to be less than y if either $$|x-y| < 2^{(LSIDLength-1)} \text{ and } x < y$$

or $$|x-y| > 2^{(LSIDLength-1)} \text{ and } x > y$$

is true. The comparison fails if the two LSIDs differ by more than $2^{(LSIDLength-1)}$.

Sending, Receiving, and Verifying LSAs

Figure 5:
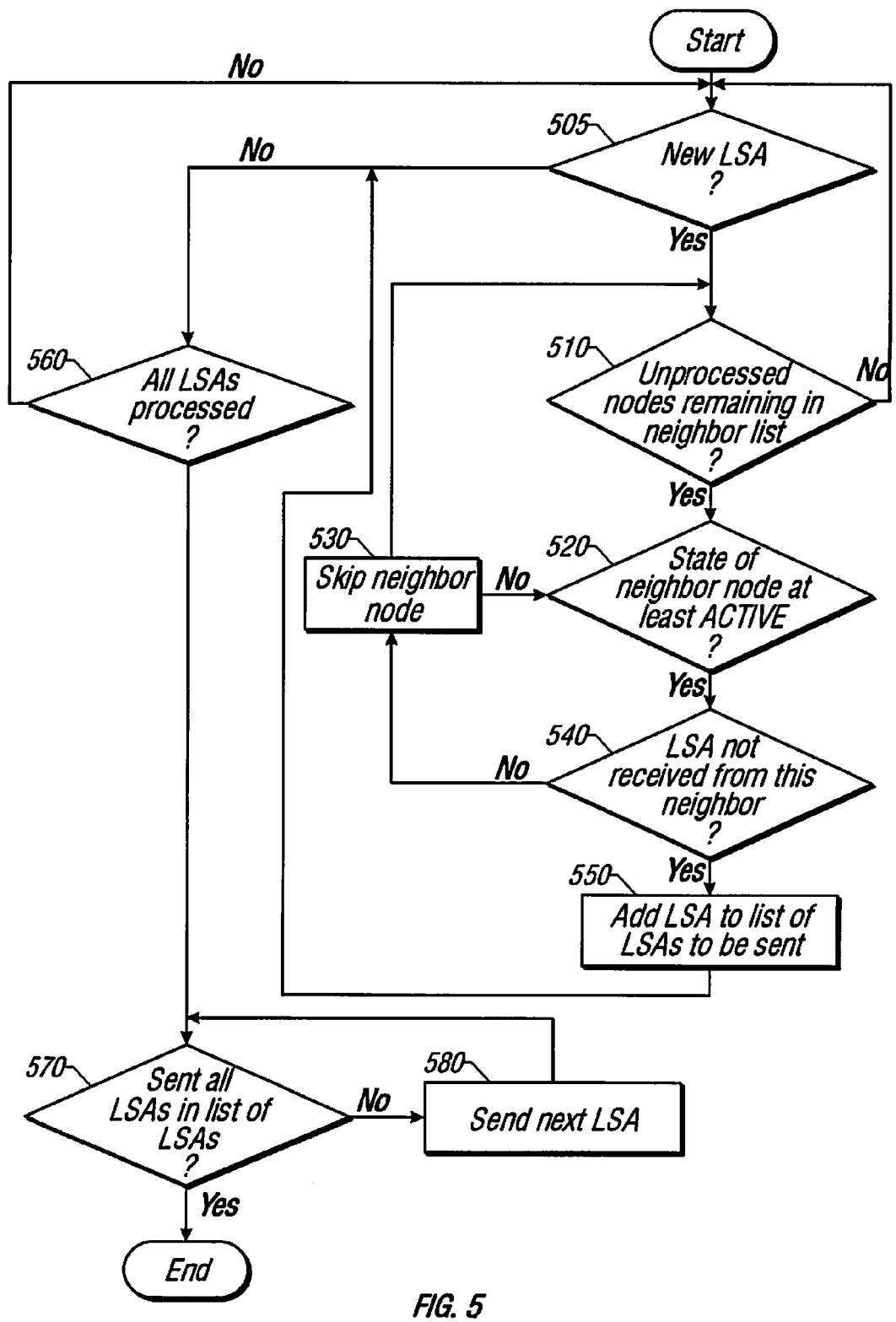
FIG. 5 is a flow diagram illustrating the actions performed in sending a Link State Advertisement (LSA).

FIG. 5 shows a flow diagram illustrating the actions performed in sending link state information using LSAs. As noted, each node is required to send a periodic Hello message on each of its active links. Such packets are usually empty (a null Hello packet), except when changes are made to the database, either through local actions or received advertisements. FIG. 5 illustrates how a given node decides which LSAs to send, when, and to what neighbors. It should be noted that each Hello message may contain several LSAs that are acknowledged as a group by sending back an appropriate response to the node sending the Hello message.

For each new LSA in the link state database (step 500), then, the following steps are taken. If the LSA is new, several actions are performed. For each node in the neighbor list (step 510), the state of the neighboring node is determined. If the state of the neighboring node is set to a value of less than ACTIVE, that node is skipped (steps 520 and 530). If the state of the neighboring node is set to a value of at least ACTIVE and if the LSA was received from this neighbor (step 540), the given neighbor is again skipped (step 530). If the LSA was not received from this neighbor (step 540), the LSA is added to the list of LSAs that are waiting to be sent by adding the LSA to this neighbor's LSAsToBeSent list (step 550). Once all LSAs have been processed (step 560), requests are sent out. This is accomplished by stepping through the list of LSAs to be sent (steps 570 and 580). Once all the LSAs have been sent, the process is complete.

Figure 6:
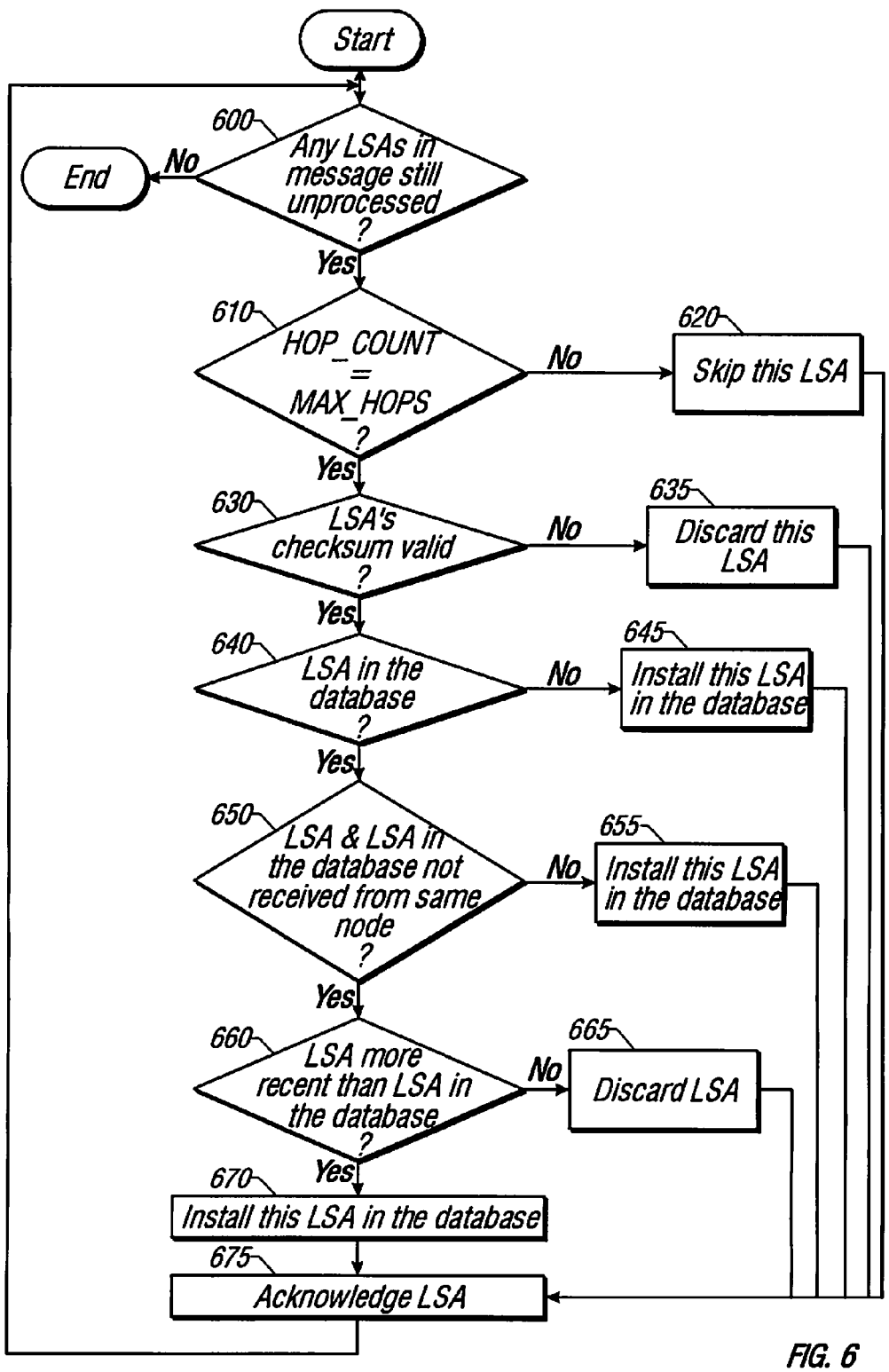
FIG. 6 is a flow diagram illustrating the actions performed in receiving an LSA.

FIG. 6 illustrates the steps performed by a node that is receiving LSAs. As noted, LSAs are received in Hello messages. Each Hello message may contain several distinct LSAs that must be acknowledged as a group by sending back an appropriate response to the node from which the Hello packet was received. The process begins at step 600, where a determination as to whether the Hello message received contains any LSAs requiring acknowledgment is made. An LSA requiring processing is first analyzed to determine if the HOP_COUNT is equal to MAX_HOPS (step 610). This indicates that HOP_COUNT was incremented past MAX_HOPS by a previous node, and implies that the originating node is too far from the receiving node to be useful. If this is the case, the current LSA is skipped (step 620). Next, the LSA's checksum is analyzed to ensure that the data in the LSA is valid (step 630). If the checksum is not valid (i.e., indicates an error), the LSA is discarded (step 435).

Otherwise, the node's link state database is searched to find the current LSA (step 640), and if not found, the current LSA is written into the database (step 645). If the current LSA is found in the link state database, the current LSA and the LSA in the database are compared to determine if they were sent from the same node (step 650). If the LSAs were from the same node, the LSA is installed in the database (step 655). If the LSAs were not from the same node, the current LSA is compared to the existing LSA to determine which of the two is more recent (step 660). The process for determining which of the two LSAs is more recent is discussed in detail below in reference to FIG. 5. If the LSA stored in the database is the more recent of the two, the LSA received is simply discarded (step 665). If the LSA in the database is less recent than the received LSA, the new LSA is installed in the database, overwriting the existing LSA (step 670). Regardless of the outcome of this analysis, the LSA is then acknowledged by sending back an appropriate response to the node having transmitted the Hello message (step 675).

Figure 7:
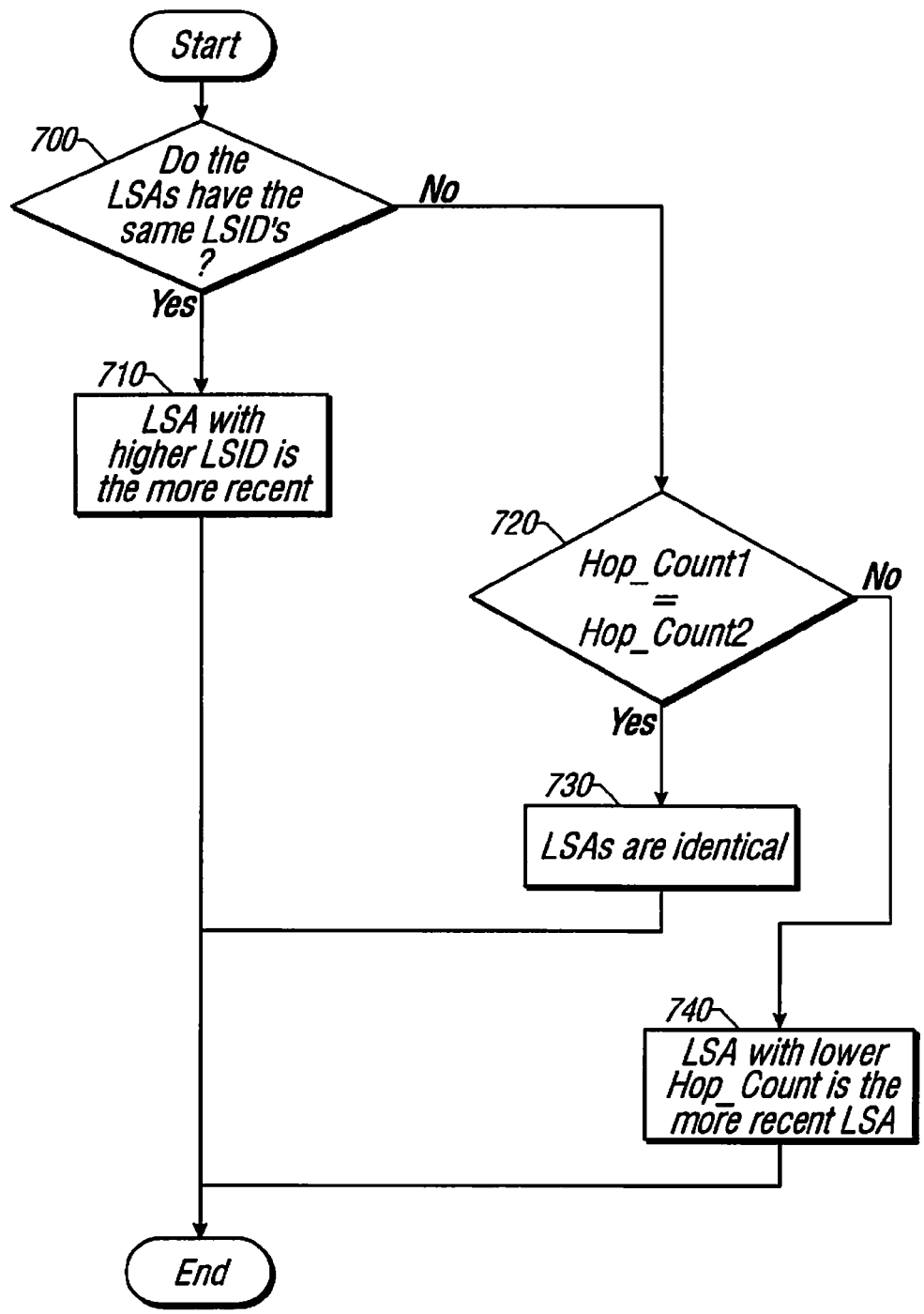
FIG. 7 is a flow diagram illustrating the actions performed in determining which of two LSAs is the more recent.

FIG. 7 illustrates one method of determining which of two LSAs is the more recent. An LSA is identified by the Node ID of its originating node. For two instances of the same LSA, the process of determining the more recent of the two begins by comparing the LSAs' LSIDs (step 700). In one embodiment, protocol the special ID FIRST_LSID is considered to be higher than any other ID. If the LSAs' LSIDs are different (step 700), the LSA with the higher LSID is the more recent of the two (step 710). If the LSAs have the same LSIDs, then HOP_COUNTs are compared (step 720). If the HOP_COUNTs of the two LSAs are equal then the LSAs are identical and neither is more recent than the other (step 730). If the HOP_COUNTs are not equal, the LSA with the lower HOP_COUNT is used (step 740). Normally, however, the LSAs will have different LSIDs.

The basic flooding mechanism in which each packet is sent to all active neighbors except the one from which the packet was received can result in an exponential number of copies of each packet. This is referred to herein as a broadcast storm. The severity of broadcast storms can be limited by one or more of the following optimizations:

1. In order to prevent a single LSA from generating an infinite number of offspring, each LSA can be configured with a HOP_COUNT field. The field, which is initialized to zero by the originating node, is incremented at each hop and, when the field reaches MAX_HOP, propagation of the LSA ceases.
2. Nodes can be configured to record the node ID of the neighbor from which they received a particular LSA and then never send the LSA to that neighbor.
3. Nodes can be prohibited from generating more than one new instance of an LSA every MinLSAInterval interval (a minimum period defined in the LSA that can be used to limit broadcast storms by limiting how often an LSA may be generated or accepted (See FIG. 15 and the accompanying discussion)).
4. Nodes can be prohibited from accepting more than one new instance of an LSA less than MinLSAInterval "younger" than the copy they currently have in the database.
5. Large networks can be divided into broadcast zones as previously described, where a given instance of a flooded packed isn't allowed to leave the boundary of its originating node's zone. This optimization also has the side benefit of reducing the round trip time of packets that require an acknowledgment from the target node.

Every node establishes adjacency with all of its neighbors. The adjacencies are used to exchange Hello packets with, and to determine the status of the neighbors. Each adjacency is represented by a neighbor data structure that contains information pertinent to the relationship with that neighbor. The fields described in Table 2 support such a relationship.

TABLE 2

Fields in the neighbor data structure.

| | |
|---|---|
| State | The state of the adjacency |
| NodeID | Node ID of the neighbor |
| Inactivity Timer | A one-shot timer, the expiration of which indicates that no Hello packet has been seen from this neighbor since the last HelloDeadInterval seconds. |
| HelloInterval | This is how often the neighbor expects Hello packets to be sent. |
| HelloDeadInterval | This is how long the neighbor waits before declaring a given neighbor dead when that neighbor stops sending Hello packets |
| LinkControlBlocks | A list of all links that exist between the two neighbors. |

Preferably, a node maintains a list of neighbors and their respective states locally. A node can detect the states of is neighbors using a set of "neighbor states," such as the following:

1. Down. This is the initial state of the adjacency. This state indicates that no valid protocol packets have been received from the neighbor.
2. INIT-Sent. This state indicates that the local node has sent an INIT request to the neighbor, and that an INIT response is expected.
3. INIT-Received. This state indicates that an INIT request was received, and acknowledged by the local node. The node is still awaiting an acknowledgment for its own INIT request from the neighbor.
4. EXCHANGE. In this state the nodes are exchanging database.
5. ACTIVE. This state is entered from the Exchange State once the two databases have been synchronized. At this stage of the adjacency, both neighbors are in full sync and ready to process other protocol packets.
6. ONE-WAY. This state is entered once an initialization message has been sent and an acknowledgement of that packet received, but before an initialization message is received from the neighboring node.

Figure 8:
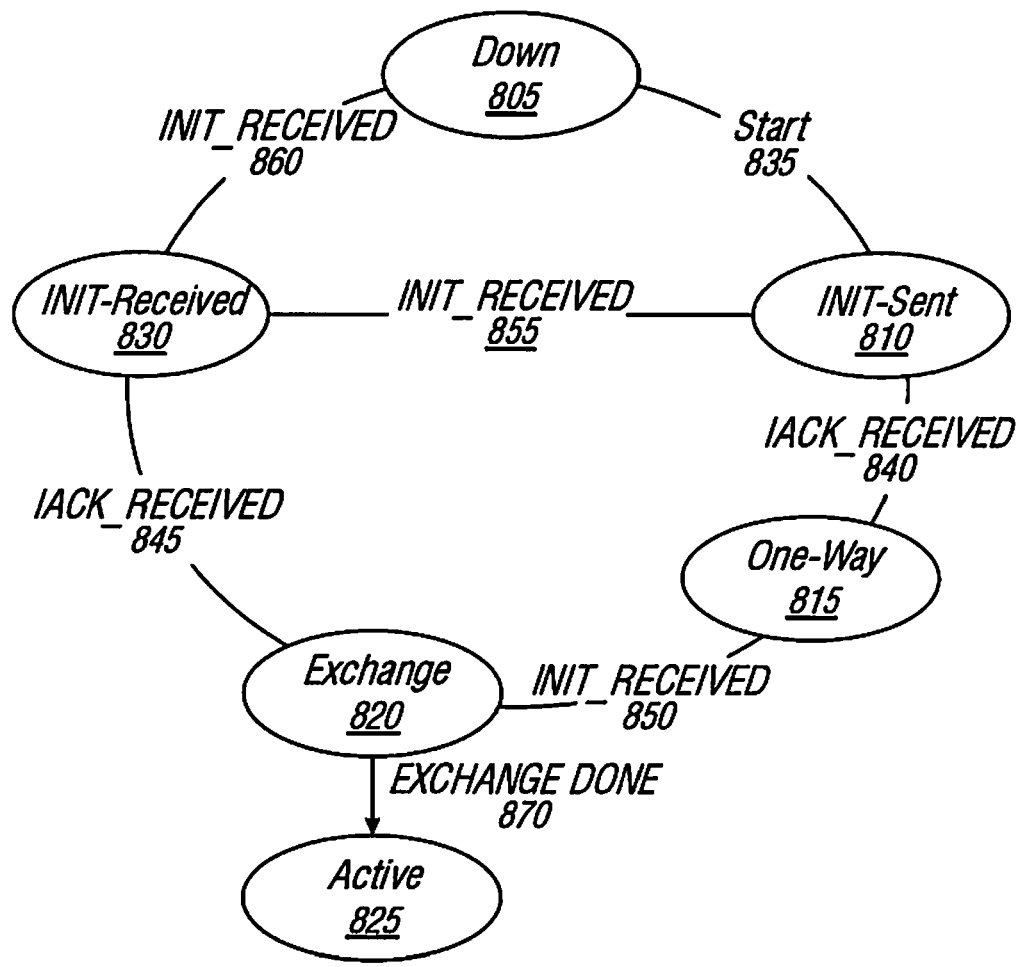
FIG. 8 is a state diagram of a Hello State Machine.

FIG. 8 illustrates a neighbor state diagram, exemplified by a Hello state machine (HSM) 800. HSM 800 keeps track of adjacencies and their states using a set of states such as those above and transitions therebetween. Preferably, each node maintains a separate instance of HSM 800 for each of its neighbors. HSM 800 is driven by a number of events that can be grouped into two main categories: internal and external. Internal events include those generated by timers and other state machines. External events are the direct result of received packets and user actions. Each event may produce different effects, depending on the current state of the adjacency and the event itself. For example, an event may:

1. Cause a transition into a new state.
2. Invoke zero or more actions.
3. Have no effect on the adjacency or its state.

HSM 800 includes a Down state 805, an INIT-Sent state 810, a ONE-WAY state 815, an EXCHANGE state 820, an ACTIVE state 825, and an INIT-Received state 830. HSM 800 transitions between these states in response to a START transition 835, IACK_RECEIVED transitions 840 and 845, INIT_RECEIVED transitions 850, 855, and 860, and an EXCHANGE DONE transition 870 in the manner described in Table 3. It should be noted that the Disabled state mentioned in Table 3 is merely a fictional state representing a non-existent neighbor and, so, is not shown in FIG. 8 for the sake of clarity. Table 3 shows state changes, their causing events, and resulting actions.

TABLE 3

HSM transitions.

| Current State | Event | New State | Action |
|---|---|---|---|
| Disabled | All | Disabled (no change) | None |
| Down | START - Initiate the adjacency establishment process | Init-Sent | Format and send an INIT request, and start the retransmission timer. |

TABLE 3-continued

HSM transitions.

| Current State | Event | New State | Action |
|---|---|---|---|
| Down | INIT_RECEIVED - The local node has received an INIT request from its neighbor | Init-Received | Format and send an INIT reply and an INIT request; start the retransmission timer |
| Init-Sent | INIT_RECEIVED - the local node has received an INIT request from the neighbor | Init-Received | Format and send an INIT reply |
| Init-Sent | IACK_RECEIVED - The local node has received a valid positive response to the INIT request | One-Way | None |
| Init-Received | IACK_RECEIVED - The local node has received a valid positive response to the INIT request. | Exchange | Format and send a Hello request. |
| One-Way | INIT_RECEIVED - The local node has received an INIT request from the neighbor | Exchange | Format and send an INIT reply |
| Exchange | EXCHANGE_DONE - The local node has successfully completed the database synchronization phase of the adjacency establishment process. | Active | Start the keep-alive and inactivity timers. |
| All states, except Down | HELLO_RECEIVED - The local node has received a valid Hello packet from its neighbor. | No change | Restart Inactivity timer |
| Init-Sent, Init-Received, Exchange | TIMER_EXPIRED - The retransmission timer has expired | Depends on the action taken | Change state to Down if MaxRetries has been reached. Otherwise, increment the retry counter and re-send the request (INIT if current state is Init-Sent or Init-Received. Hello otherwise). |
| Active | TIMER_EXPIRED - The keep-alive timer has expired. | Depends on the action taken. | Increment inactivity counter by HelloInterval and if the new value exceeds HelloDeadInterval, then generate a LINK_DOWN event. This indicates that the local node hasn't received a valid Hello packet from the neighbor in at least HelloDeadInterval seconds. Otherwise, the neighbor is still alive and kicking, so simply restart the keep-alive timer. |
| All states, except Down | LINK_DOWN - All links between the two nodes have failed and the neighbor is now unreachable. | Down | Timeout all database entries previously received from this neighbor. |
| All states, except Down | PROTOCOL_ERROR - An unrecoverable protocol error has been detected on this adjacency. | Down | Timeout all database entries previously received from this neighbor. |

After the successful exchange of INIT packets, the two neighbors enter the Exchange State. Exchange is a transitional state that allows both nodes to synchronize their databases before entering the Active State. Database synchronization involves exchange of one or more Hello packets that transfer the contents of one node's database to the other. A node should not send a Hello request while its awaiting the acknowledgment of another. The exchange may be made more reliable by causing each request to be transmitted repeatedly until a valid acknowledgment is received from the adjacent node.

When a Hello packet arrives at a node, the Hello packet is processed as previously described. Specifically, the node compares each LSA contained in the packet to the copy the node currently has in its own database. If the received copy is more recent then the node's own or advertises a better hopcount, the received copy is written into the database, possibly replacing the current copy. The exchange process is normally considered completed when each node has received, and acknowledged, a null Hello request from its neighbor. The nodes then enter the Active State with fully synchronized databases which contain the most recent copies of all LSAs known to both neighbors.

A sample exchange using the Hello protocol is described in Table 4. In the following exchange, node 1 has four LSAs in its database, while node 2 has none.

TABLE 4

Sample exchange.

| Node 1 | Node 2 |
| --- | --- |
| Send Hello Request<br>Sequence: 1<br>Contents: LSA1, LSA2, LSA2, LSA4 | Send Hello Request<br>Sequence: 1<br>Contents: null |
| Send Hello Response<br>Sequence: 1<br>Contents: null | Send Hello Response<br>Sequence: 1<br>Contents: 0x000f (acknowledges all four LSAs) |
| Send Hello Request<br>Sequence: 2<br>Contents: null (no more entries) | Send Hello Response<br>Sequence: 2<br>Contents: null |

Another example is the exchange described in Table 5. In the following exchange, node 1 has four LSAs (1 through 4) in its database, and node 2 has 7 (3 and 5 through 10). Additionally, node 2 has a more recent copy of LSA3 in its database than node 1.

TABLE 5

Sample exchange.

| Node 1 | Node 2 |
| --- | --- |
| Send Hello Request<br>Sequence: 1<br>Contents: LSA1, LSA2, LSA2, LSA4 | Send Hello Request<br>Sequence: 1<br>Contents: LSA3, LSA5, LSA6, LSA7 |
| Send Hello Response<br>Sequence: 1<br>Contents: null | Send Hello Response<br>Sequence: 1<br>Contents: 0x000f (acknowledges all four LSAs) |
| Send Hello Request<br>Sequence: 2<br>Contents: null (no more entries) | Send Hello Response<br>Sequence: 2<br>Contents: LSA8, LSA9, LSA10 |
| Send Hello Response<br>Sequence: 2<br>Contents: 0x0007 (acknowledges all three LSAs) | Send Hello Response<br>Sequence: 2<br>Contents: null |
| Send Hello Response<br>Sequence: 3<br>Contents: null | Send Hello Request<br>Sequence: 3<br>Contents: null (no more entries) |

At the end of the exchange, both nodes will have the most recent copy of all 10 LSAs (1 through 10) in their databases.

Provisioning

For each VP that is to be configured (or, as also referred to herein, provisioned), a physical path needs to be selected and configured. VPs may be provisioned statically or dynamically. For example, a user can identify the nodes through which the VP will pass and manually configure each node to support the given VP. Using a method according to the present invention this is done using a centralized technique via a master node. The selection of nodes may be based on any number of criteria, such as QoS, latency, cost, and the like. Alternatively, the VP may be provisioned dynamically using any one of a number of methods, such as a shortest path first technique or a distributed technique (e.g. as described herein). An example of a distributed technique is the restoration method described subsequently herein.

Failure Detection, Propagation, and Restoration

Failure Detection and Propagation

In one embodiment of networks herein, failures are detected using the mechanisms provided by the underlying physical network. For example, when using a SONET network, a fiber cut on a given link results in a loss of signal (LOS) condition at the nodes connected by that link. The LOS condition propagated an Alarm Indication Signal (AIS) downstream, and Remote Defect Indication (RDI) upstream (if the path still exists), and an LOS defect locally. Later, the defect is upgraded to a failure 2.5 seconds later, which causes an alarm to be sent to the Operations System (OS) (per Bellcore's recommendations in GR-253 (GR-253: *Synchronous Optical Network (SONET) Transport Systems*, Common Generic Criteria, Issue 2 [Bellcore, December 1995], included herein by reference, in its entirety and for all purposes)). Preferably when using SONET, the handling of the LOS condition follows Bellcore's recommendations in GR-253, which allows nodes to inter-operate, and co-exist, with other network equipment (NE) in the same network. The mesh restoration protocol is invoked as soon as the LOS defect is detected by the line card, which occurs 3 ms following the failure (a requirement under GR-253).

The arrival of the AIS at the downstream node causes that downstream node to send a similar alarm to its downstream neighbor and for that node to send an AIS to its own downstream neighbor. This continues from node to node until the AIS finally reaches the source node of the affected VP, or a proxy border node if the source node is located in a different zone. In the latter case, the border node restores the VP on behalf of the source node. Under GR-253, each node is allowed a maximum of 125 microseconds to forward the AIS downstream, which quickly propagates failures toward the source node.

Once a node has detected a failure on one of its links, either through a local LOS defect or a received AIS indication, the node scans its VP table looking for entries that have the failed link in their path. When the node finds one, the node releases all link bandwidth used by the VP. Then, if the node is a VP's source node or a proxy border node, the VP's state is changed to RESTORING and the VP placed on a list of VPs to be restored. Otherwise (if the node isn't the source node or a proxy border node), the state of the VP is changed to DOWN, and a timer is started to delete the VP from the database if a corresponding restore-path request isn't received from the origin node within a certain timeout period. The VP list that was created in the previous step is ordered by quality of service (QoS), which ensures that VPs with a higher QoS setting are restored first. Each entry in the list contains, among other things, the ID of the VP, its source and destination nodes, configured QoS level, and required bandwidth.

Figure 9:
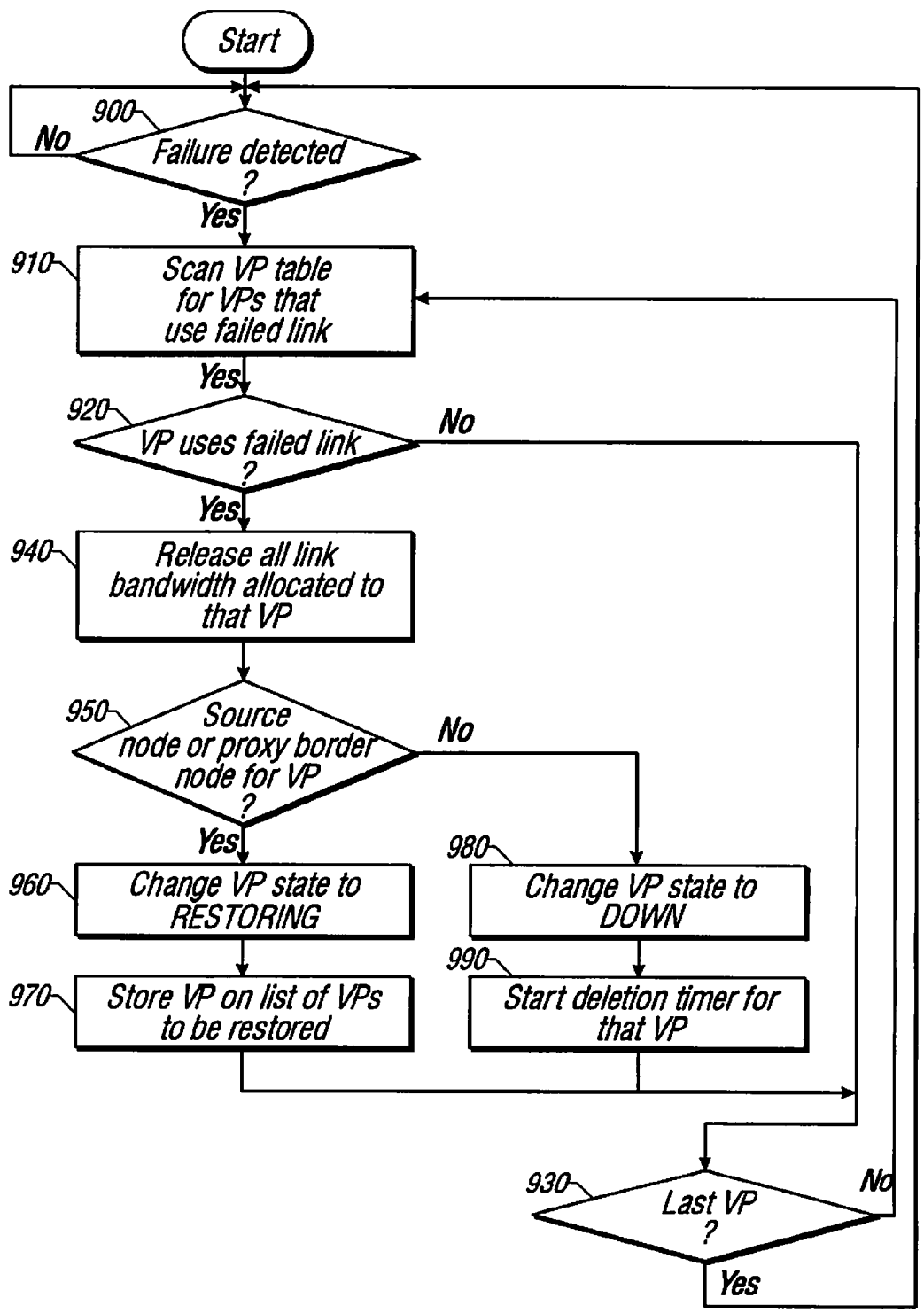
FIG. 9 is a flow diagram illustrating the actions performed in preparation for path restoration in response to a link failure.

FIG. 9 illustrates the steps performed in response to the failure of a link. As noted, the failure of a link results in a LOS condition at the nodes connected to the link and generates an AIS downstream and an RDI upstream. If an AIS or RDI were received from a node, a failure has been detected (step 900). In that case, each affected node performs several actions in order to maintain accurate status information with regard to the VPs that each affected node currently supports. The first action taken in such a case, is that the node scans its VP table looking for entries that have the failed link in their path (steps 910 and 920). If the VP does not use the failed link, the node goes to the next VP in the table and begins analyzing that entry (step 930). If the selected VP uses the failed link, the node releases all link bandwidth allocated to that VP (step 940). The node then determines whether the node is a source node or a proxy border node for the VP (step 950). If this is the case, the node changes the VP's state to RESTORING (step 960) and stores the VP on the list of VPs to be restored (step 970). If the node is not a source node or proxy border node for the VP, the node changes the VP state to DOWN (step 980) and starts a deletion timer for that VP (step 990).

Failure Restoration

For each VP on the list, the node then sends an RPR to all eligible neighbors in order to restore the given VP. The network will, of course, attempt to restore all failed VPs. Neighbor eligibility is determined by the state of the neighbor, available link bandwidth, current zone topology, location of the Target node, and other parameters. One method for determining the eligibility of a particular neighbor follows:

1. The origin node builds a shortest path first (SPF) tree with "self" as root. Prior to building the SPF tree, the link-state database is pruned of all links that either don't have enough (available) bandwidth to satisfy the request, or have been assigned a QoS level that exceeds that of the VP being restored.
2. The node then selects the output link(s) that can lead to the target node in less than MAX_HOPS hops. The structure and contents of the SPF tree generated simplifies this step.

The RPR carries information about the VP, such as:
1. The Node IDs of the origin and target nodes.
2. The ID of the VP being restored.
3. A locally unique sequence number that gets incremented by the origin node on every retransmission of the request. The 8-bit sequence number, along with the Node and VP IDs, allow specific instances of an RPR to be identified by the nodes.
4. An 8-bit field that carries the distance, in hops, between the origin node the receiving node. This field is initially set to zero by the originating node, and is incremented by 1 by each node along the path.
5. An array of link IDs that records the path of the message on its trip from the origin node to the target node.

Due to the way RPR messages are forwarded by tandem nodes and the unconditional and periodic retransmission of such messages by origin nodes, multiple instances of the same request are not uncommon, even multiple copies of each instance, circulating the network at any given time. To minimize the amount of broadcast traffic generated by the protocol and aid tandem nodes in allocating bandwidth fairly for competing RPRs, tandem nodes preferably execute a sequence such as that described subsequently.

The term "same instance," as used below, refers to messages that carry the same VP ID, origin node ID, and hop-count, and are received from the same tandem node (usually, the same input link, assuming only one link between nodes). Any two messages that meet the above criteria are guaranteed to have been sent by the same origin node, over the same link, to restore the same VP, and to have traversed the same path. The terms "copy of an instance," or more simply "copy" are used herein to refer to a retransmission of a given instance. Normally, tandem nodes select the first instance they receive since in most, but not all cases, as the first RPR received normally represents the quickest path to the origin node. A method for making such a determination was described in reference to FIG. 5. Because such information must be stored for numerous RPRs, a standard data structure is defined under this protocol.

The Restore-Path Request Entry (RPRE) is a data structure that maintains information about a specific instance of a RPRE packet. Tandem nodes use the structure to store information about the request, which helps them identify and reject other instances of the request, and allows them to correlate received responses with forwarded requests. Table 6 lists an example of the fields that are preferably present in an RPRE.

TABLE 6

RPR Fields

| Field | Usage |
|---|---|
| Origin Node | The Node ID of the node that originated this request. This is either the source node of the VP or a proxy border node. |
| Target Node | Node ID of the target node of the restore path request. This is either the destination node of the VP or a proxy border node. |
| Received From | The neighbor from which we received this message. |
| First Sequence Number | Sequence number of the first received copy of the corresponding restore-path request. |
| Last Sequence Number | Sequence number of the last received copy of the corresponding restore-path request. |
| Bandwidth | Requested bandwidth |
| QoS | Requested QoS |
| Timer | Used by the node to timeout the RPR |
| T-Bit | Set to 1 when a Terminate indicator is received from any of the neighbors. |
| Pending Replies | Number of the neighbors that haven't acknowledged this message yet. |
| Sent To | A list of all neighbors that received a copy of this message. Each entry contains the following information about the neighbor: AckReceived: Indicates if a response has been received from this neighbor. F-Bit: Set to 1 when Flush indicator from this neighbor. |

When an RPR packet arrives at a tandem node, a decision is made as to which neighbor should receive a copy of the request. The choice of neighbors is related to variables such as link capacity and distance. Specifically, a particular neighbor is selected to receive a copy of the packet if:

1. The output link has enough resources to satisfy the requested bandwidth. Nodes maintain a separate "available bandwidth" counter for each of the defined QoS levels (e.g. QoS0-2 and QoS3). VPs assigned to certain QoS level, say "n," are allowed to use all link resources reserved for that level and all levels below that level, i.e., all resources reserved for levels 0 through n, inclusive.
2. The path through the neighbor is less than MAX_HOPS in length. In other words, the distance from this node to the target node is less than MAX_HOPS minus the distance from this node to the origin node.
3. The node hasn't returned a Flush response for this specific instance of the RPR, or a Terminate response for this or any other instance.

The Processing of Received RPRs

Figure 10A:
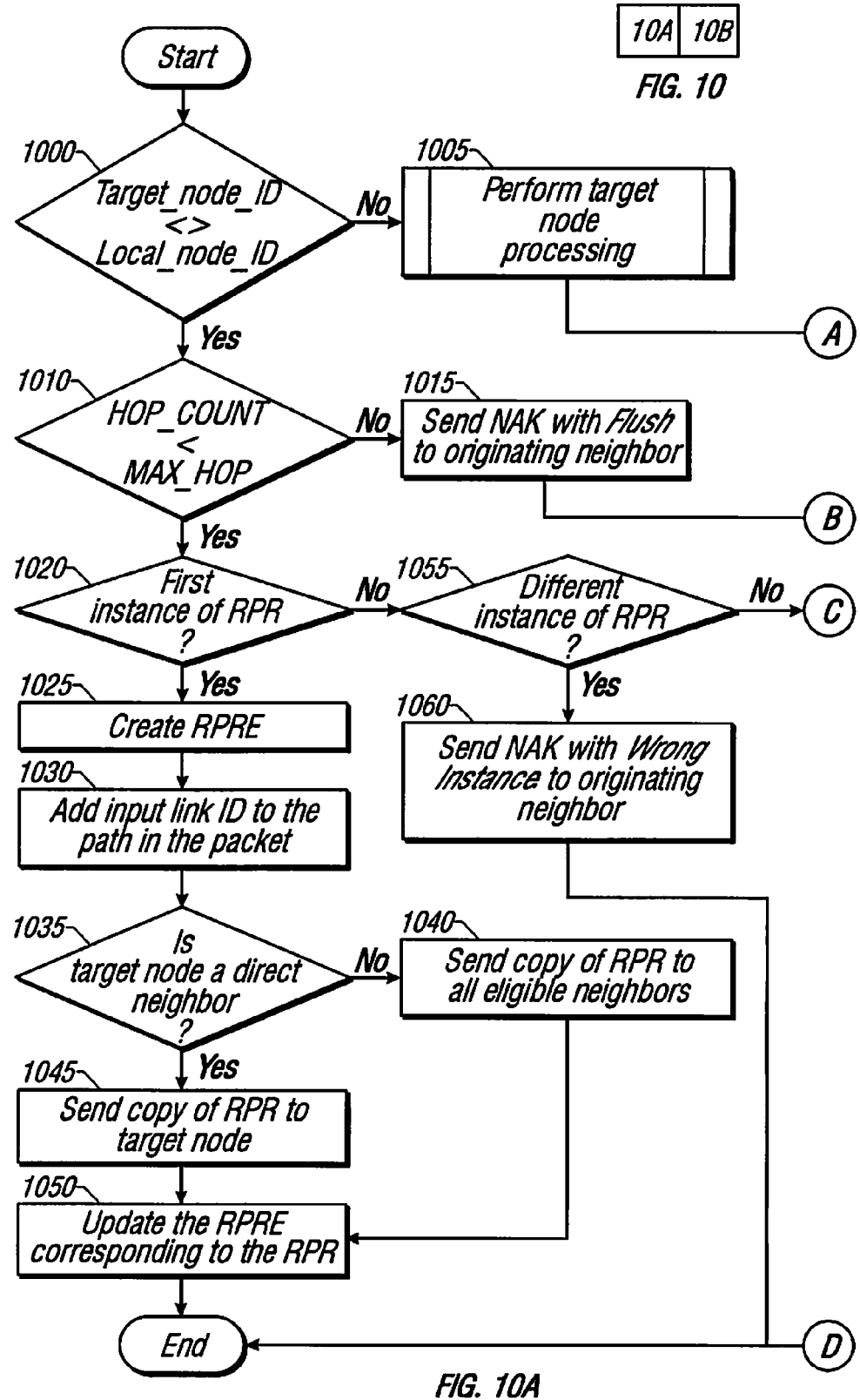
FIG. 10 is a flow diagram illustrating the actions performed in processing received Restore-Path Requests (RPR) executed by tandem nodes.
Figure 10B:
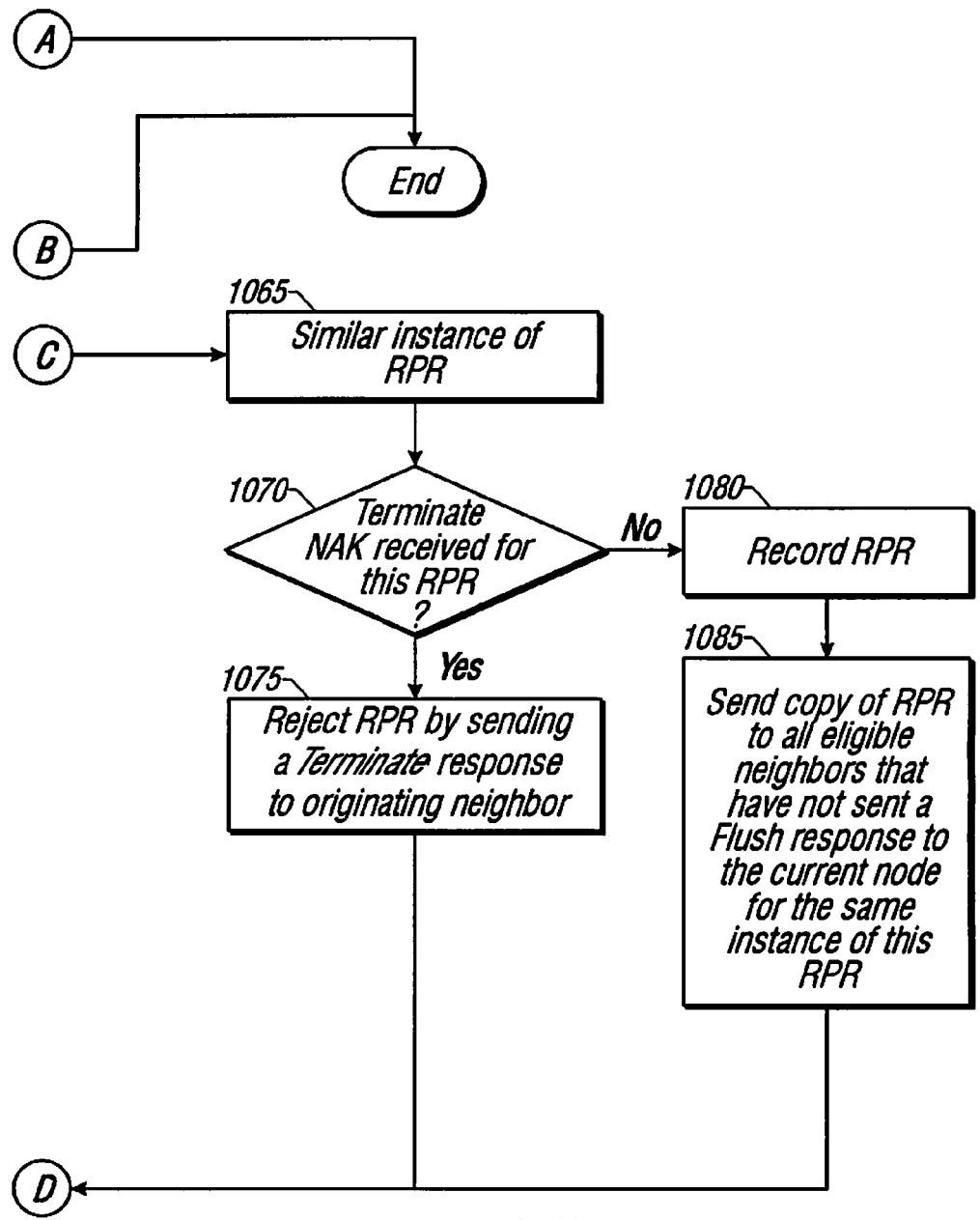

FIG. 10 illustrates the actions performed by tandem nodes in processing received RPR tests. Assuming that this is the first instance of the request, the node allocates the requested bandwidth on eligible links and transmits a modified copy of the received message onto them. The bandwidth remains allocated until a response (either positive or negative) is received from the neighboring node, or a positive response is received from any of the other neighbors (see Table 7 below). While awaiting a response from its neighbors, the node cannot use the allocated bandwidth to restore other VPs, regardless of their priority (i.e. QoS).

Processing of RPRs begins at step 1000, in which the target node's ID is compared to the local node's ID. If the local node's ID is equal to the target node's ID, the local node is the target of the RPR and must process the RPR as such. This is illustrated in FIG. 10 as step 1005 and is the subject of the flow diagram illustrated in FIG. 11. If the local node is not the target node, the RPR's HOP_COUNT is compared to MAX_HOP in order to determine if the HOP_COUNT has exceed or will exceed the maximum number of hops allowable (step 1010). If this is the case, a negative acknowledgment (NAK) with a Flush indicator is then sent back to the originating node (step 1015). If the HOP_COUNT is still within acceptable limits, the node then determines whether this is the first instance of the RPR having been received (step 1020). If this is the case, a Restore-Path Request Entry (RPRE) is created for the request (step 1025). This is done by creating the RPRE and setting the RPRE's fields, including starting a time-to-live (TTL) or deletion timer, in the following manner:

RPRE.SourceNode=Header.Origin
RPRE.Destination Node=Header.Target
RPRE.FirstSequence Number=Header.SequenceNumber
RPRE.Last Sequence Number=Header.Sequence Number
RPRE.QoS=Header.Parms.RestorePath.QoS
RPRE.Bandwidth=Header.Parms.RestorePath.Bandwidth
RPRE.ReceivedFrom=Node ID of the neighbor that sent us this message
StartTimer (RPRE.Timer, RPR_TTL)

The ID of the input link is then added to the path in the RPRE (e.g., Path[PathIndex++]=LinkID) (step 1030). Next, the local node determines whether the target node is a direct neighbor (step 1035). If the target node is not a direct neighbor of the local node, a copy of the (modified) RPR is sent to all eligible neighbors (step 1040). The PendingReplies and SentTo Fields of the corresponding RPRE are also updated accordingly at this time. If the target node is a direct neighbor of the local node, the RPR is sent only to the target node (step 1045). In either case, the RPRE corresponding to the given RPR is then updated (step 1050).

If this is not the first instance of the RPR received by the local node, the local node then attempts to determine whether this might be a different instance of the RPR (step 1055). A request is considered to be a different instance if the RPR:

1. Carries the same origin node IDs in its header;
2. Specifies the same VP ID; and
3. Was either received from a different neighbor or has a different HOP_COUNT in its header.

If this is simply a different instance of the RPR, and another instance of the same RPR has been processed, and accepted, by this node, a NAK Wrong Instance is sent to the originating neighbor (step 1060). The response follows the reverse of the path carried in the request. No broadcasting is therefore necessary in such a case. If a similar instance of the RPR has been processed and accepted by this node (step 1065), the local node determines whether a Terminate NAK has been received for this RPR (step 1070). If a Terminate NAK has been received for this RPR, the RPR is rejected by sending a Terminate response to the originating neighbor (step 1075). If a Terminate NAK was not received for this RPR, the new sequence number is recorded (step 1080) and a copy of the RPR is forwarded to all eligible neighbors that have not sent a Flush response to the local node for the same instance of this RPR (step 1085). This may include nodes that weren't previously considered by this node due to conflicts with other VPs, but does not include nodes from which a Flush response has already been received for the same instance of this RPR. The local node should then save the number of sent requests in the PendingReplies field of the corresponding RPRE. The term "eligible neighbors" refers to all adjacent nodes that are connected through links that meet the link-eligibility requirements previously described. Preferably, bandwidth is allocated only once for each request so that subsequent transmissions of the request do not consume any bandwidth.

Note that the bandwidth allocated for a given RPR is released differently depending on the type of response received by the node and the setting of the Flush and Terminate indicators in its header. Table 7 shows the action taken by a tandem node when the tandem node receives a restore path response from one of its neighbors.

TABLE 7

Actions taken by a tandem node upon receiving an RPR.

| Response Type | Flush Indicator? | Terminate Indicator? | Received Sequence Number | Action |
| --- | --- | --- | --- | --- |
| X | X | X | Not Valid | Ignore response |
| Negative | No | No | not equal to Last | Ignore response |

TABLE 7-continued

Actions taken by a tandem node upon receiving an RPR.

| Response Type | Flush Indicator? | Terminate Indicator? | Received Sequence Number | Action |
|---|---|---|---|---|
| Negative | X | No | equal to Last | Release bandwidth allocated for the VP on the link the response was received on |
| Negative | Yes | No | Valid | Release bandwidth allocated for the VP on the link that the response was received on |
| Negative | X | Yes | Valid | Release all bandwidth allocated for the VP |
| Positive | X | X | Valid | Commit bandwidth allocated for the VP on the link the response was received on; release all other bandwidth. |

Figure 11:
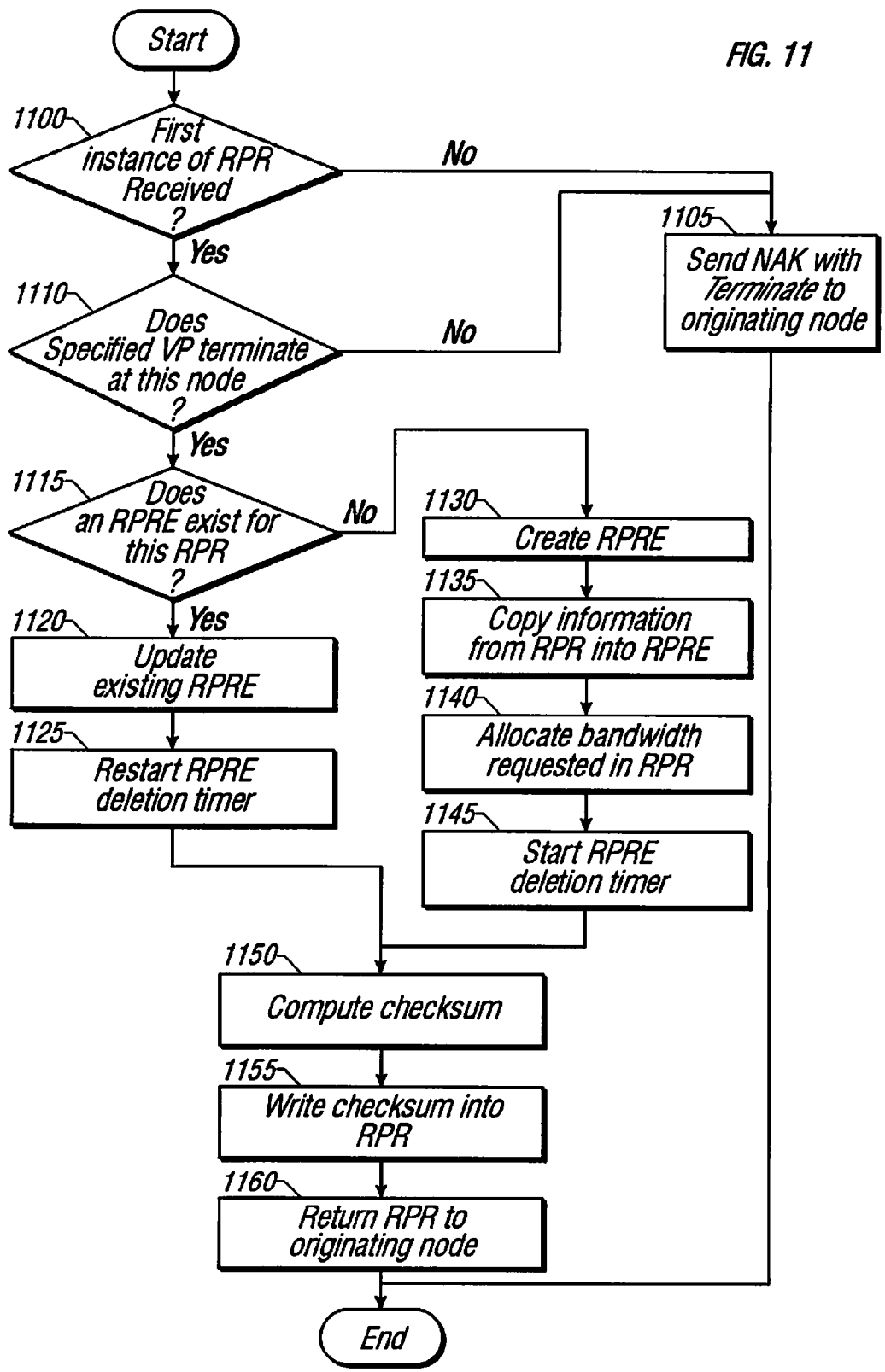
FIG. 11 is a flow diagram illustrating the actions performed in the processing of an RPR by the RPR's target node.

FIG. 11 illustrates the process performed at the target node once the RPR finally reaches that node. When the RPR reaches its designated target node, the target node begins processing of the RPR by first determining whether this is the first instance of this RPR that has been received (step 1100). If that is not the case, a NAK is sent with a Terminate indicator sent to the originating node (step 1105). If this is the first instance of the RPR received, the target node determines whether or not the VP specified in the RPR actually terminates at this node (step 1110). If the VP does not terminate at this node, the target node again sends a NAK with a Terminate to the originating node (step 1105). By sending a NAK with a Terminate indicator, resources allocated along the path are freed by the corresponding tandem nodes.

If the VP specified in the RPR terminates at this node (i.e. this node is indeed the target node), the target node determines whether an RPRE exists for the RPR received (step 1115). If an RPRE already exists for this RPR, the existing RPRE is updated (e.g., the RPRE's LastSequenceNumber field is updated) (step 1120) and the RPRE deletion timer is restarted (step 1125). If no RPRE exists for this RPR in the target node (i.e., if this is the first copy of the instance received), an RPRE is created (step 1130), pertinent information from the RPR is copied into the RPRE (step 1135), the bandwidth requested in the RPR is allocated on the input link by the target node (step 1140) and an RPRE deletion timer is started (step 1145). In either case, once the RPRE is either updated or created, a checksum is computed for the RPR (step 1150) and written into the checksum field of the RPR (step 1155). The RPR is then returned as a positive response to the origin node (step 1160). The local (target) node then starts its own matrix configuration. It will be noted that the RPRE created is not strictly necessary, but makes the processing of RPRs consistent across nodes.

The Processing of Received RPR Responses

Figure 12A:
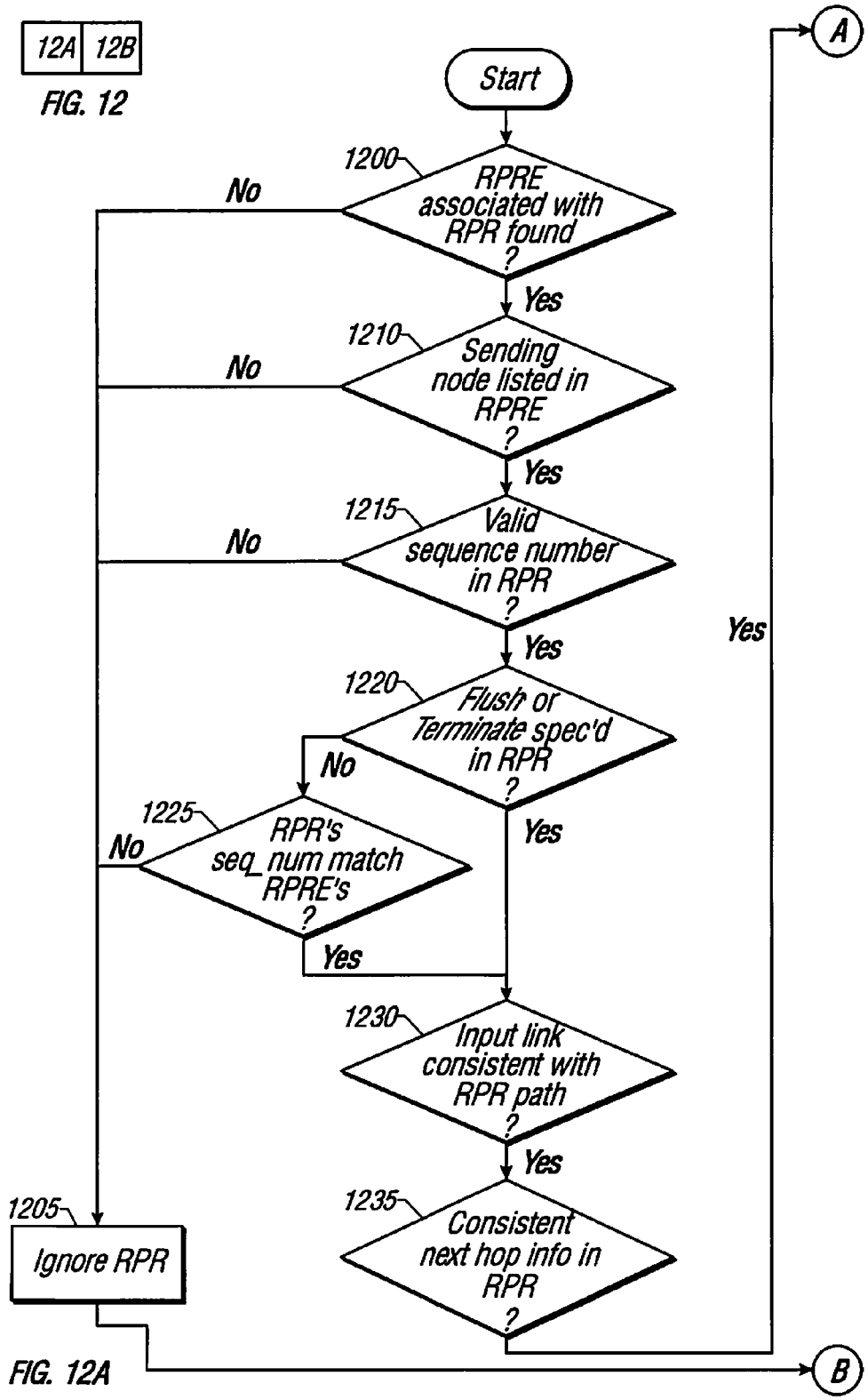
FIG. 12 is a flow diagram illustrating the actions performed in returning a negative response in response to an RPR.
Figure 12B:
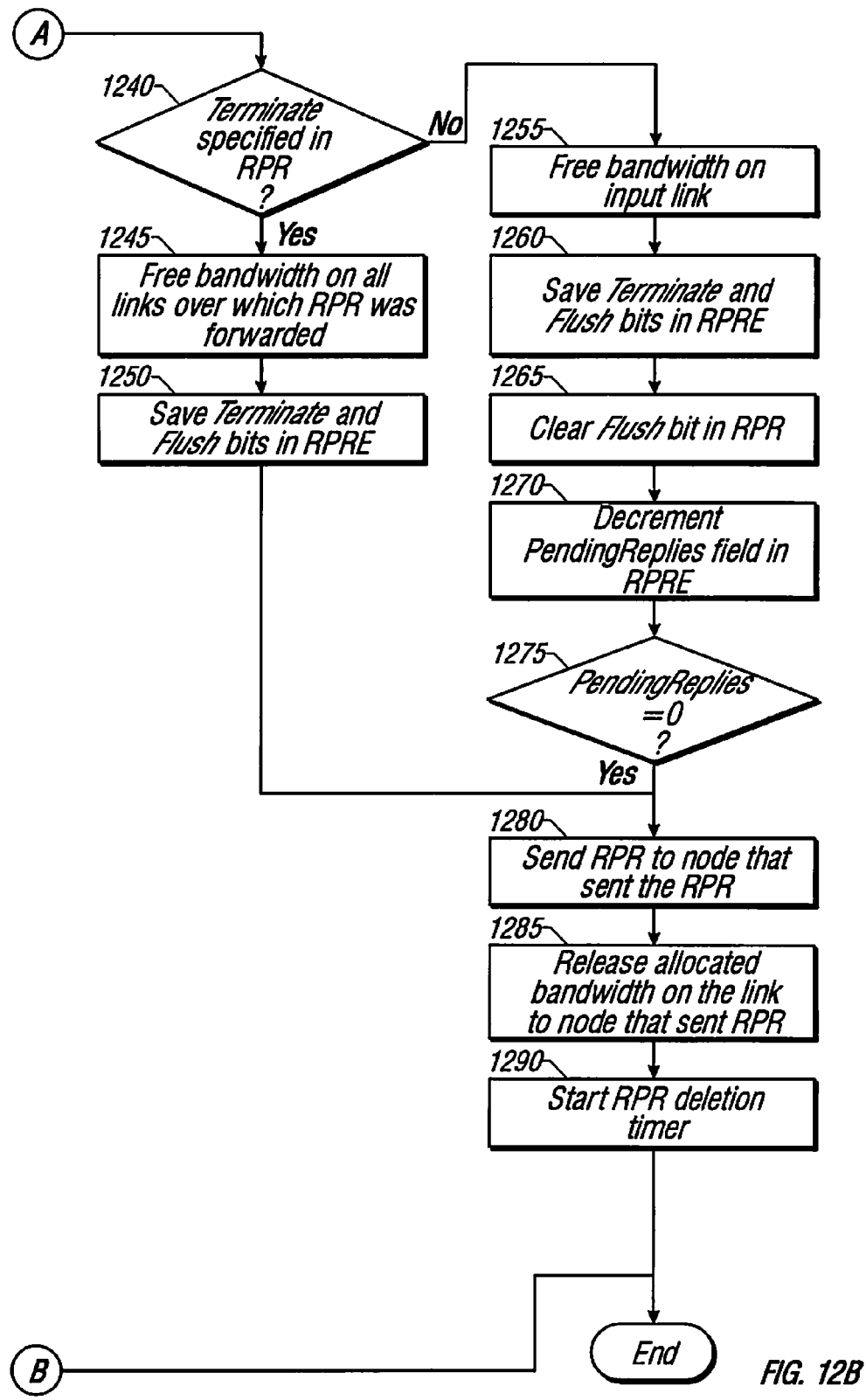
Figure 13:
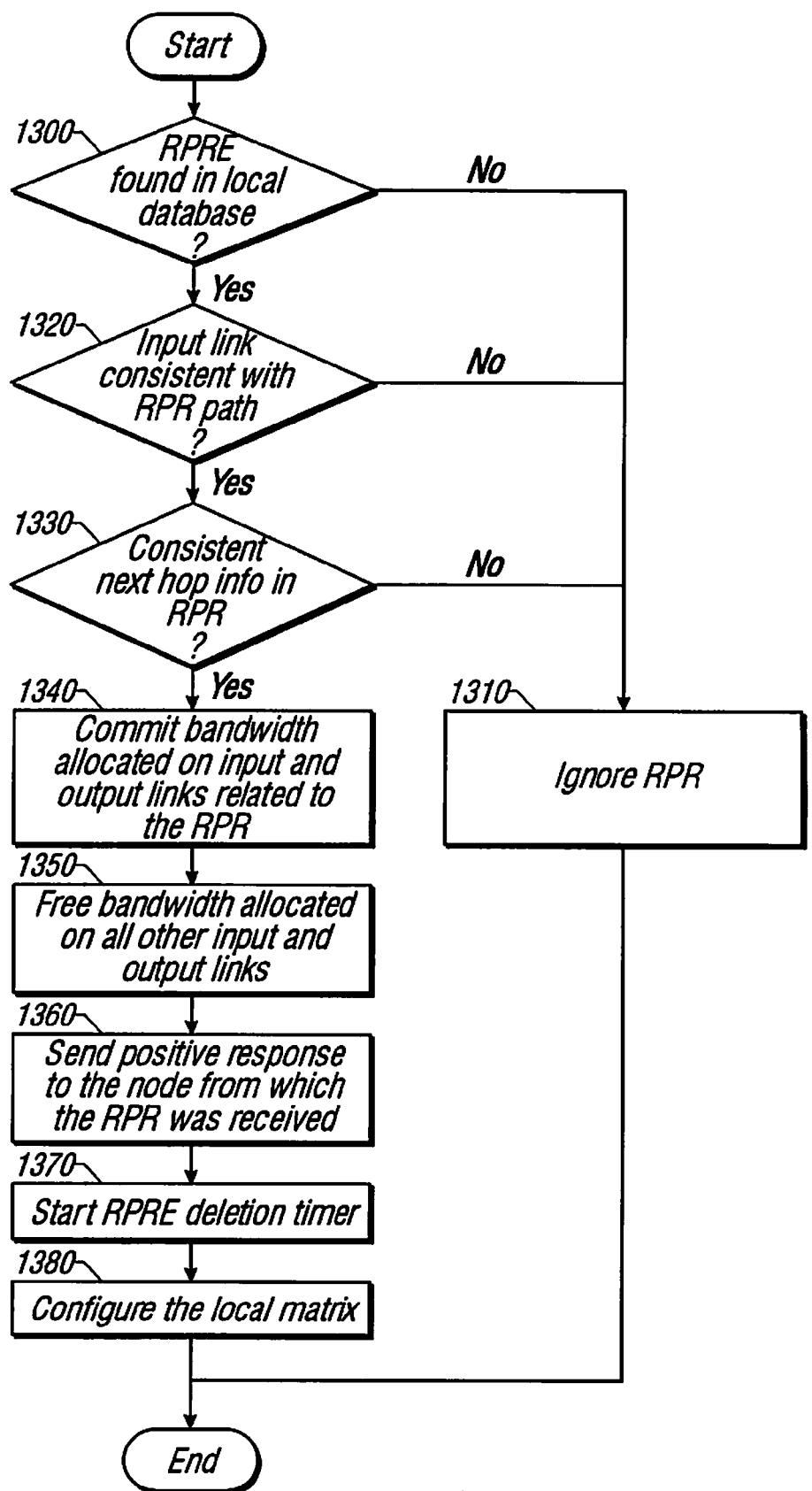
FIG. 13 is a flow diagram illustrating the actions performed in returning a positive response to a received RPR.

FIGS. 12 and 13 are flow diagrams illustrating the processes performed by originating nodes that receive negative and positive RPR responses, respectively. Negative RPR responses are processed as depicted in FIG. 12. An originating node begins processing a negative RPR response by determining whether the negative RPR response has an RPRE associated with the RPR (step 1200). If the receiving node does not have an RPRE for the received RPR response, the RPR response is ignored (step 1205). If an associated RPRE is found, the receiving node determines whether the node sending the RPR response is listed in the RPRE (e.g., is actually in the SentTo list of the RPRE) (step 1210). If the sending node is not listed in the RPRE, again the RPR response is ignored (step 1205).

If the sending node is listed in the RPRE, the RPR sequence number is analyzed to determine whether or not the RPR sequence number is valid (step 1215). As with the previous steps, if the RPR contains an invalid sequence number (e.g., doesn't fall between FirstSequenceNumber and LastSequence Number, inclusive), the RPR response is ignored (step 1205). If the RPR sequence number is valid, the receiving node determines whether Flush or Terminate in the RPR response (step 1220). If neither of these is specified, the RPR response sequence number is compared to that stored in the last sequence field of the RPR (step 1225). If the RPR response sequence number does not match that found in the last sequence field of the RPRE, the RPR response is again ignored (step 1205). If the RPR response sequence number matches that found in the RPRE, or a Flush or Terminate was specified in the RPR, the input link on which the RPR response was received is compared to that listed in the RPR response path field (e.g., Response.Path[Response.PathIndex]==InputLinkID) (step 1230). If the input link is consistent with information in the RPR, the next hop information in the RPR is checked for consistency (e.g., Response.Path [Response.PathIndex+1]==RPRE.ReceivedFrom) (step 1235). If either of the proceeding two tests are failed the RPR response is again ignored (step 1205).

If a Terminate was specified in the RPR response (step 1240), the bandwidth on all links over which the RPR was forwarded is freed (step 1245) and the Terminate and Flush bits from the RPR response are saved in the RPRE (step 1250). If a Terminate was not specified in the RPR response, bandwidth is freed only on the input link (i.e., the link from which the response was received) (step 1255), the Terminate and Flush bits are saved in the RPRE (step 1260), and the Flush bit of the RPR is cleared (step 1265). If a Terminate was not specified in the RPR, Pending Replies field in the RPRE is decremented (step 1270). If this field remains non-zero after being decremented the process completes. If Pending Replies is equal to zero at this point, or a Terminate was not specified in the RPR, the RPR is sent to the node specified in the RPR's Received From field (i.e. the node that sent the corresponding request) (step 1280). Next, the bandwidth allocated on the link to the node specified in the RPR's Received From field is released (step 1285) and an RPR deletion timer is started (step 1290).

FIG. 13 illustrates the steps taken in processing positive RPR responses. The processing of positive RPR responses begins at step 1300 with a search of the local database to determine whether an RPRE corresponding to the RPR response is stored therein. If a corresponding RPRE cannot be found, the RPR response is ignored (step 1310). If the RPR response RPRE is found in the local database, the input link is verified as being consistent with the path stored in the RPR (step 1320). If the input link is not consistent with the RPR path, the RPR response is ignored once again (step 1310). If the input link is consistent with path information in the RPR, the next hop information specified in the RPR response path is compared with the Received From field of the RPRE (e.g., Response.Path[Response.PathIndex+1]!=RPRE.Received-From) (step 1330). If the next hop information is not consistent, the RPR response is again ignored (step 1310). However, if the RPR response's next hop information is consistent, bandwidth allocated on input and output links related to the RPR is committed (step 1340). Conversely, bandwidth allocated on all other input and output links for that VP is freed at this time (step 1350). Additionally, a positive response is sent to the node from which the RPR was received (step 1360), and an RPR deletion timer is started (step 1370) and the local matrix is configured (step 1380).

With regard to matrix configuration, the protocol pipelines such activity with the forwarding of RPRs in order to minimize the impact of matrix configuration overhead on the time required for restoration. While the response is making its way from node N1 to node N2, node N1 is busy configuring its matrix. In most cases, by the time the response reaches the origin node, all nodes along the path have already configured their matrices.

The Terminate indicator prevents "bad" instances of an RPR from circulating around the network for extended periods of time. The Terminate indicator is propagated all the way back to the originating node and prevents the originating node, and all other nodes along the path, from sending or forwarding other copies of the corresponding RPR instance.

Terminating RPR Packets are processed as follows. The RPR continues along the path until any one of the following four conditions is encountered:
 1. The RPR's HOP_COUNT reaches the maximum allowed (i.e. MAX_HOPS).
 2. The request reaches a node that doesn't have enough bandwidth on any of its output links to satisfy the request.
 3. The request reaches a node that had previously accepted a different instance of the same request from another neighbor.
 4. The request reaches its ultimate destination: the target node, which is either the destination node of the VP, or a proxy border node if the source and destination nodes are located in difference zones.

Conditions 1, 2 and 3 cause a negative response to be sent back to the originating node, flowing along the path carried in the request, but in the reverse direction.

Further optimizations of the protocol can easily be envisioned by one of skill in the art, and are intended to be within the scope of this specification. For example in one embodiment, a mechanism is defined to further reduce the amount of broadcast traffic generated for any given VP. In order to prevent an upstream neighbor from sending the same instance of an RPR every T milliseconds, a tandem node can immediately return a no-commit positive response to that neighbor, which prevents that neighbor from sending further copies of the instance. The response simply acknowledges the receipt of the request, and doesn't commit the sender to any of the requested resources. Preferably, however, the sender (of the positive response) periodically transmits the acknowledged request until a valid response is received from its downstream neighbor(s). This mechanism implements a piece-wise, or hop-by-hop, acknowledgment strategy that limits the scope of retransmitted packets to a region that gets progressively smaller as the request gets closer to its target node.

Optimizations

However, it is prudent to provide some optimizations for efficiently handling errors. Communication protocols often handle link errors by starting a timer after every transmission and, if a valid response isn't received within the timeout period, the message is retransmitted. If a response isn't received after a certain number of retransmission, the sender generates a local error and disables the connection. The timeout period is usually a configurable parameter, but in some cases the timeout period is computed dynamically, and continuously, by the two end points. The simplest form of this uses some multiple of the average round trip time as a timeout period, while others use complex mathematical formulas to determine this value. Depending on the distance between the two nodes, the speed of link that connects them, and the latency of the equipment along the path, the timeout period can range anywhere from millisecond to seconds.

The above strategy is not the preferred method of handling link errors. This is because the fast restoration times required dictates that 2-way, end-to-end communication be carried out in less than 50 ms. A drawback of the above-described solution is the time wasted while waiting for an acknowledgment to come back from the receiving node. A safe timeout period for a 2000 mile span, for instance, is over 35 ms, which doesn't leave enough time for a retransmission in case of an error.

This problem is addressed in one embodiment by taking advantage of the multiple communication channels, i.e. OC-48's that exist between nodes to:
 1. Send N copies (N>=1) of the same request over as many channels, and
 2. Re-send the request every T milliseconds (1 ms<10 ms) until a valid response is received from the destination node.

The protocol can further improve link efficiency by using small packets during the restoration procedure. Empirical testing in a simulated 40-node SONET network spanning the entire continental United States, showed that an N of 2 and a T of 15 ms provide a good balance between bandwidth utilization and path restorability. Other values can be used, of course, to improve bandwidth utilization or path restorability to the desired level. Additionally, the redeemed number of resends eliminates broadcast storms and the waste of bandwidth in the network.

Figure 14:
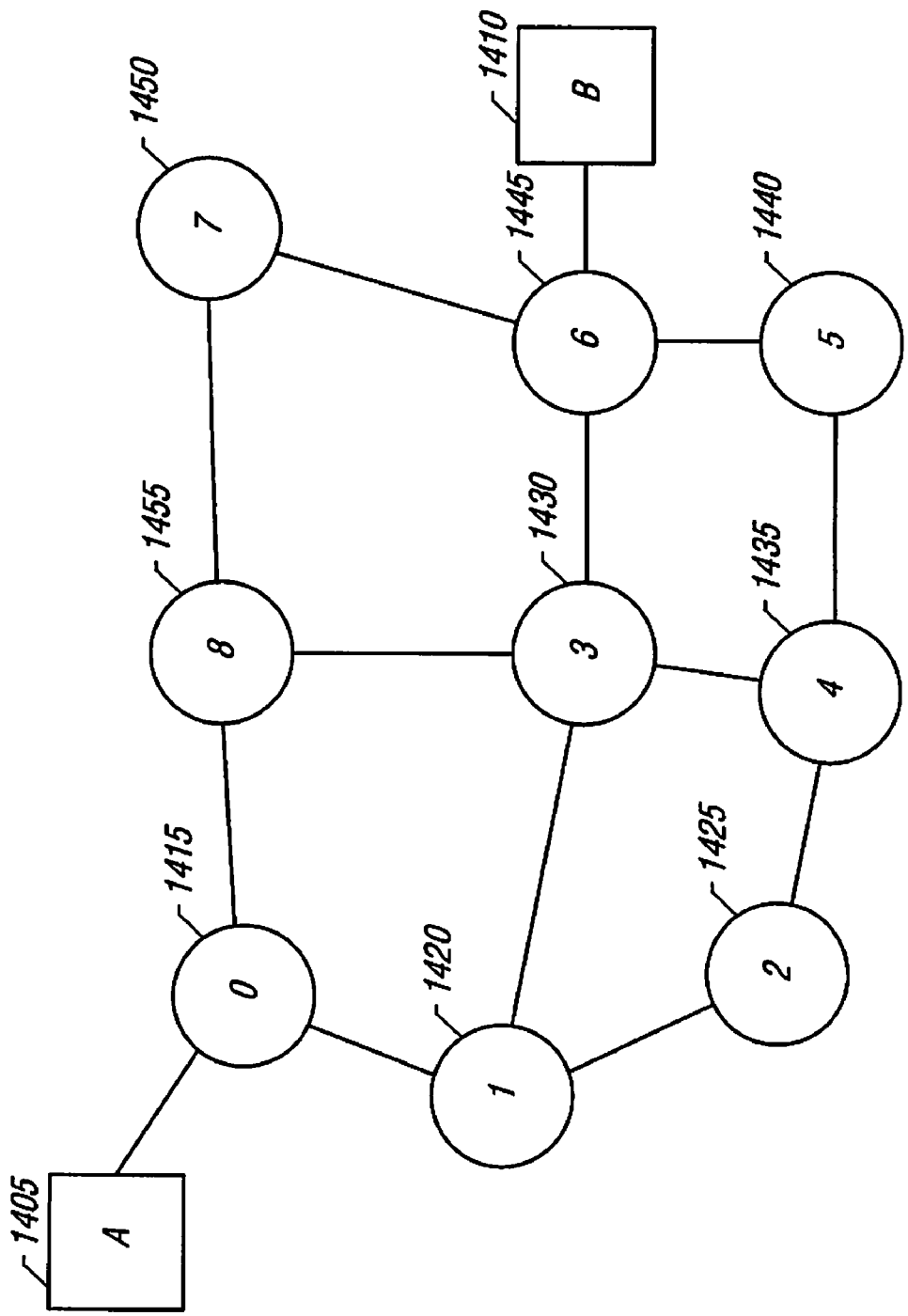
FIG. 14 is a block diagram illustrating an exemplary network.

FIG. 14 illustrates an exemplary network 1400. Network 1400 includes a pair of computers (computers 1405 and 1410) and a number of nodes (nodes 1415-1455). In the protocol, the nodes also have a node ID which is indicated inside circles depicting the node which range from zero to eight successively. The node IDs are assigned by the network provider. Node 1415 (node ID 0) is referred to herein as a source node, and node 1445 (node ID 6) is referred to herein as a destination node for a VP 0 (not shown). As previously noted, this adheres to the protocol's convention of having the node with the lower ID be the source node for the virtual path and the node with the higher node ID be the destination node for the VP.

Network 1400 is flat, meaning that all nodes belong to the same zone, zone 0 or the backbone zone. This also implies that Node IDs and Node Addresses are one and the same, and that the upper three bits of the Node ID (address) are always zeroes using the aforementioned node ID configuration. Table 8 shows link information for network 1400. Source nodes are listed in the first column, and the destination nodes are listed in the first row of Table 8. The second row of Table 8 lists the link ID (L), the available bandwidth (B), and distance (D) associated with each of the links. In this example, no other metrics (e.g., QoS) are used in provisioning the VPs listed subsequently.

TABLE 8

Link information for network 1400.

|   | 0 | | | 1 | | | 2 | | | 3 | | | 4 | | | 5 | | | 6 | | | 7 | | | 8 | | |
|---|---|---|---|---|---|---|---|---|---|---|---|---|---|---|---|---|---|---|---|---|---|---|---|---|---|---|---|
|   | L | B | D | L | B | D | L | B | D | L | B | D | L | B | D | L | B | D | L | B | D | L | B | D | L | B | D |
| 0 | * | * | * | 0 | 18 | 10 | — | — | — | — | — | — | — | — | — | — | — | — | — | — | — | — | — | — | 1 | 19 | 8 |
| 1 | 0 | 18 | 10 | * | * | * | 2 | 12 | 6 | 3 | 17 | 14 | — | — | — | — | — | — | — | — | — | — | — | — | — | — | — |
| 2 | — | — | — | 2 | 12 | 6 | * | * | * | — | — | — | 4 | 13 | 11 | — | — | — | — | — | — | — | — | — | — | — | — |
| 3 | — | — | — | 3 | 17 | 14 | — | — | — | * | * | * | 5 | 16 | 7 | — | — | — | 6 | 22 | 8 | — | — | — | 7 | 10 | 15 |
| 4 | — | — | — | — | — | — | 4 | 13 | 11 | 5 | 16 | 7 | * | * | * | 8 | 14 | 13 | — | — | — | — | — | — | — | — | — |
| 5 | — | — | — | — | — | — | — | — | — | — | — | — | 8 | 14 | 13 | * | * | * | 9 | 6 | 9 | — | — | — | — | — | — |
| 6 | — | — | — | — | — | — | — | — | — | 6 | 22 | 8 | — | — | — | 9 | 6 | 9 | * | * | * | 10 | 39 | 20 | — | — | — |
| 7 | — | — | — | — | — | — | — | — | — | — | — | — | — | — | — | — | — | — | 10 | 39 | 20 | * | * | * | 11 | 15 | 19 |
| 8 | 1 | 19 | 8 | — | — | — | — | — | — | 7 | 10 | 15 | — | — | — | — | — | — | — | — | — | 11 | 15 | 19 | * | * | * |

Table 9A shows a list of exemplary configured VPs, and Table 9B shows the path selected for each VP by a shortest-path algorithm such as that described herein. The algorithm allows a number of metrics, e.g. distance, cost, delay, and the like to be considered during the path selection process, which makes it possible to route VPs based on user preference. Here, the QoS metric is used to determine which VP has priority.

TABLE 9A

Configured VPs.

| VP ID | Source Node | Destination Node | Bandwidth | QoS |
|---|---|---|---|---|
| 0 | 0 | 6 | 1 | 3 |
| 1 | 0 | 5 | 2 | 0 |
| 2 | 1 | 7 | 1 | 1 |
| 3 | 4 | 6 | 2 | 2 |
| 4 | 3 | 5 | 1 | 3 |

TABLE 9B

Initial routes.

| VP ID | Path (Numbers represent node IDs) |
|---|---|
| 0 | 0→1→3→6 |
| 1 | 0→1→3→4→5 |
| 2 | 1→3→6→7 |
| 3 | 4→3→6 |
| 4 | 3→4→5 |

Reachability Algorithm

Routes are computed using a QoS-based shortest-path algorithm. The route selection process relies on configured metrics and an up-to-date view of network topology to find the shortest paths for configured VPs. The topology database contains information about all network nodes, their links, and available capacity. All node IDs are assigned by the user and must be globally unique. This gives the user control over the master/slave relationship between nodes. Duplicate IDs are detected by the network during adjacency establishment. All nodes found with a duplicate ID are disabled by the protocol, and an appropriate alarm is generated to notify the network operations center of the problem so that proper action can be taken.

The algorithm uses the following variables.

1. Ready—A queue that holds a list of nodes, or vertices, that need to be processed.
2. Database—The pruned copy of the topology database, which is acquired automatically by the node using the Hello protocol. The computing node removes all vertices and or links that do not meet the specified QoS and bandwidth requirements of the route.
3. Neighbors [A]—An array of "A" neighbors. Each entry contains a pointer to a neighbor data structure as previously described.
4. Path [N][H]—A two dimensional array (N rows by H columns, where N is the number of nodes in the network and H is the maximum hop count). Position (n, h) of the array contains a pointer to the following structure (R is the root node, i.e., the computing node):

| | |
|---|---|
| Cost | Cost of the path from R to n |
| NextHop | Next node along the path from R to n |
| PrevHop | Previous node along the path from n to R |

The algorithm proceeds as follows (again, R is the root node, i.e. the one computing the routes):

1. Fill column 1 of the array as follows: for each node n know to R, initialize entry Path [n][1] as follows:

```
If n is a neighbor of R then,
    Cost = Neighbors [n].LinkCost
    NextHop = n
    PrevHop = R
    Place n in Ready
Else (n is not a neighbor of R)
    Cost = MAX_COST
    NextHop = INVALID_NODE_ID
    PrevHop = INVALID_NODE_ID
```

2. For all other columns (h=2 through H) proceed as follows:
   a. If Ready is empty, go to 3 (done).
   b. Else, copy column h-1 to column h
   c. For each node n in Ready (do not include nodes added during this iteration of the loop):
      i. For each neighbor m of n (as listed in n's LSA):
         Add the cost of the path from R to n to the cost of the link between n and m. If computed cost is lower than the cost of the path from R to m, then change entry Path [m][h] as follows:
         Cost=Computed cost
         NextHop=Path [n][h-1].NextHop
         PrevHop=n
         Add m to Ready.
            (It will be processed on the next iteration of h.)
3. Done. Save h in a global variable called LastHop.

Figure 15A:
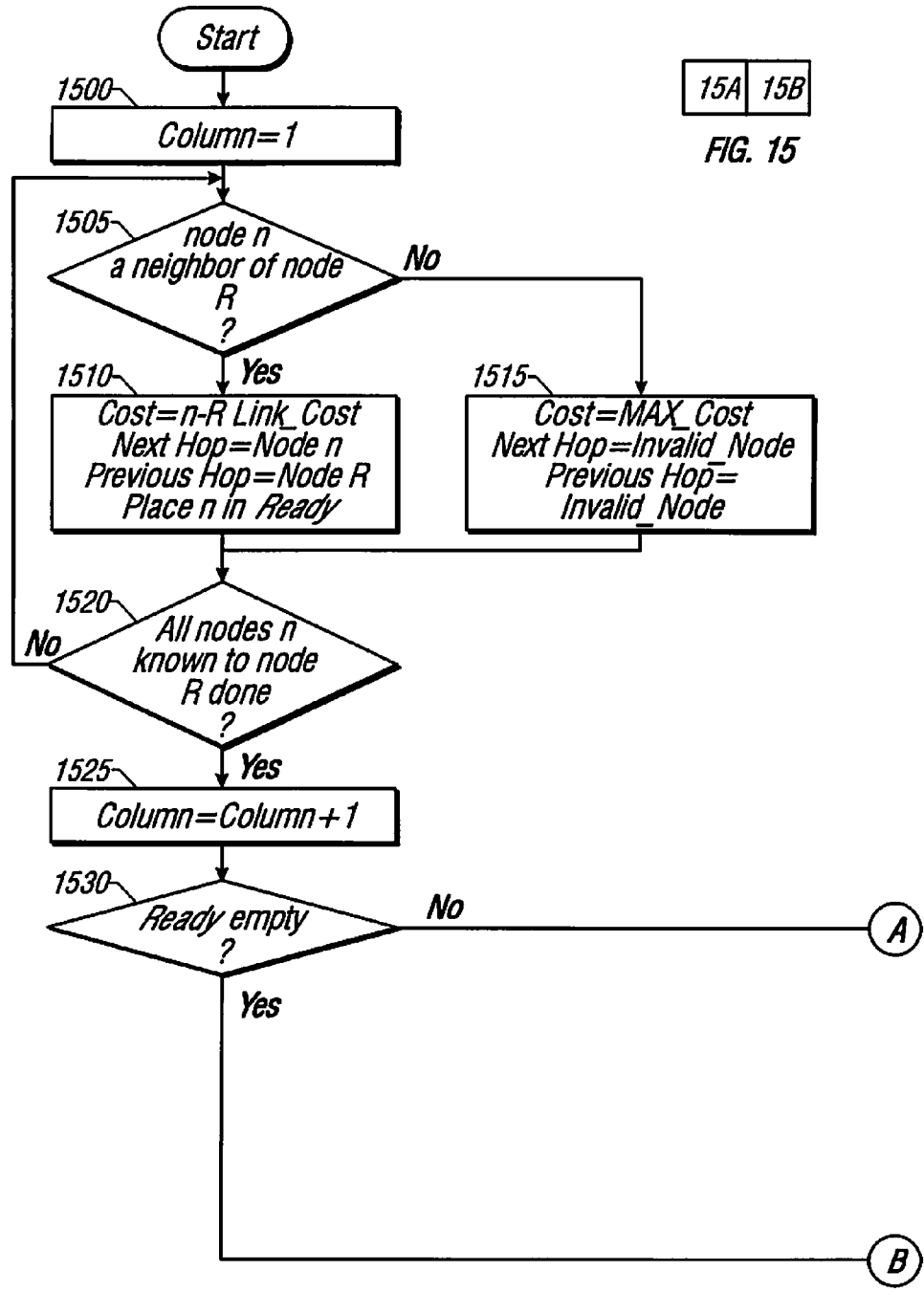
FIG. 15 is a flow diagram illustrating the actions performed in calculating the shortest path between nodes based on Quality of Service (QoS) for a given Virtual Path (VP).
Figure 15B:
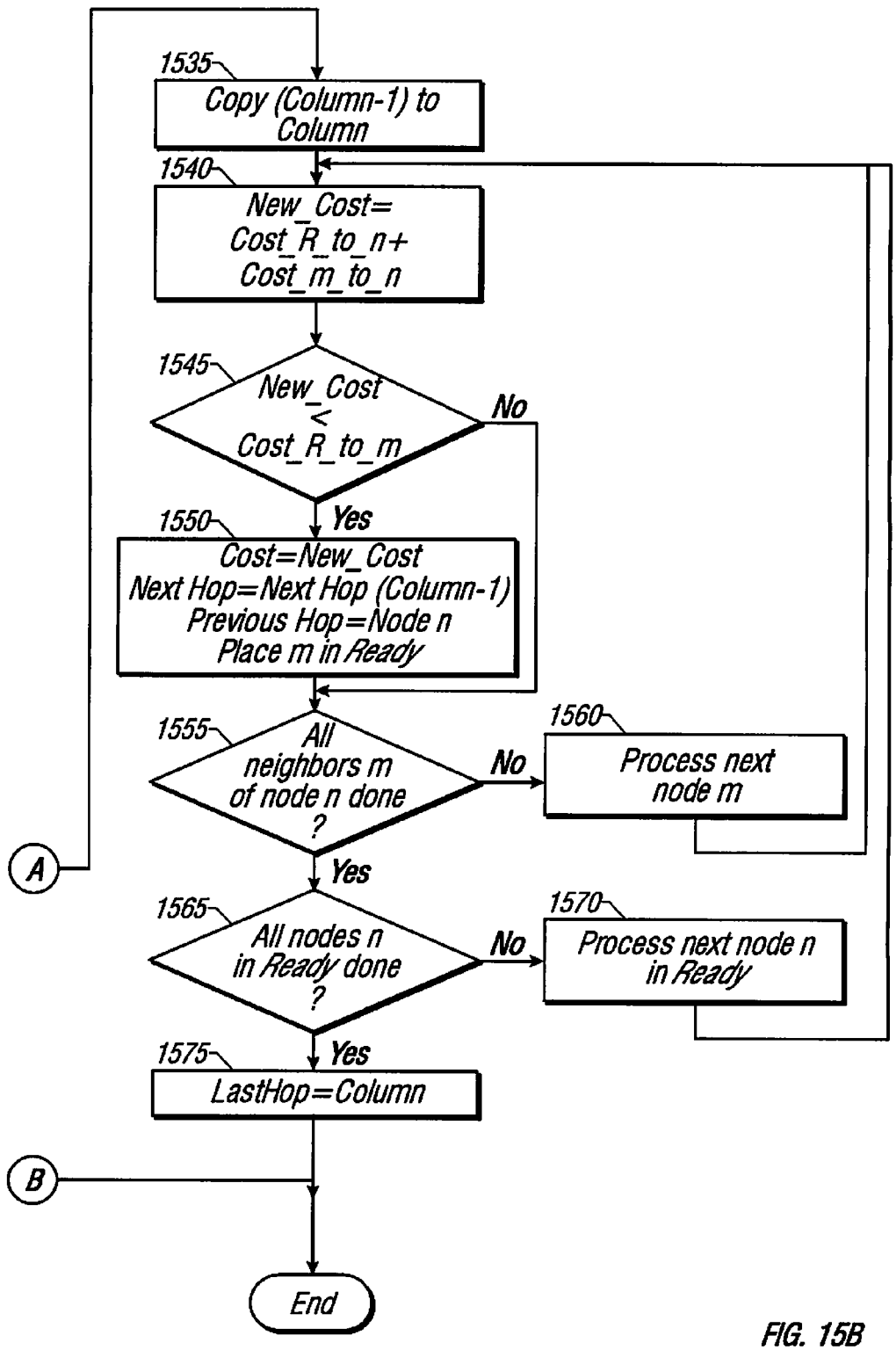

FIG. 15 illustrates a flow diagram of the above QoS-based shortest path route selection process (referred to herein as a QSPF process) that can be used in one embodiment of the protocol. The process begins at step 1500 by starting with the first column of the array that the QSPF process generates. The process initializes the first column in the array for each node n known to node R. Thus, node R first determines if the current node is a neighbor (step 1505). If the node is the neighbor, several variables are set and the representation of node n is placed in the Ready queue (step 1510). If node n is not a neighbor of node R, those variables are set to indicate that such is the case (step 1515). In either case, node R continues through the list of possible node n's (step 1520). Node R then goes on to fill other columns of the array (step 1525) until the Ready queue which holds a list of nodes waiting to be processed is empty (step 1530). Assuming that nodes remain to be processed, the column preceding the current column is copied into the current column (step 1535) and a new cost is generated (step 1540). If this new cost is greater than the cost from node R to node m (step 1545) then the entry is updated with new information then m is placed on the Ready queue (step 1550). Once this has been accomplished or if the new cost is less than the current cost from node R to node m, the process loops if all neighbors m of node n have not been processed (steps 1555 and 1560). If more nodes await processing in the Ready queue (step 1565), they are processed in order (step 1570), but if all nodes have been processed, the Last Hop variable is set to the number of columns in the array (step 1575) and the process is at an end.

For any given hop-count (1 through LastHop), Path [ ] ultimately contains the best route from R to all other nodes in the network. To find the shortest path (in terms of hops, not distance) from R to n, row n of the array is searched until an entry with a cost not equal to MAX_COST is found. To find the least-cost path between R and n, regardless of the hop-count, entries 1 through LastHop of row n are scanned, and the entry with the lowest cost selected.

Format and Usage of Protocol Messages

Protocol messages (or packets) preferably begin with a standard header to facilitate their processing. Such a header preferably contains the information necessary to determine the type, origin, destination, and identity of the packet. Normally, the header is then followed by some sort of command-specific data (e.g., zero or more bytes of information).

Figures 16, 17:
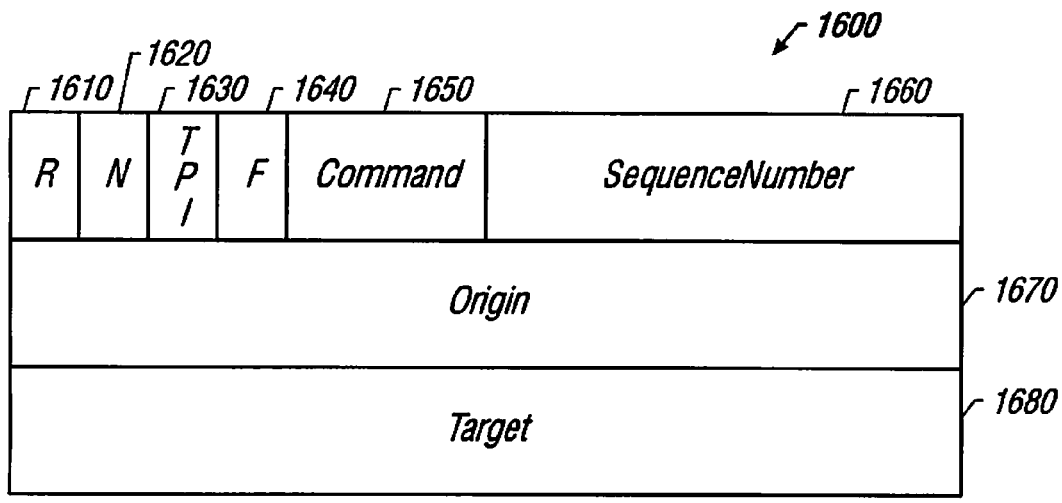
FIG. 16 illustrates the layout of a protocol header.
FIG. 17 illustrates the layout of an initialization packet.

FIG. 16 illustrates the layout of a header 1600. Shown therein is a request response indicator (RRI) 1610, a negative response indicator (NRI), a terminate/commit path indicator (TPI) 1630, a flush path indicator (FPI) 1640, a command field 1650, a sequence number (1660), an origin node ID (1670) and a target node ID (1680). A description of these fields is provided below in Table 10. It will be noted that although the terms "origin" and "target" are used in describing header 1600, their counterparts (source and destination, respectively) can be used in their stead. Preferably, packets sent using a protocol such as is described herein employ a header layout such as that shown as header 1600. Header 1600 is then followed by zero or more bytes of command specific data, the format of which, for certain commands, is shown in FIGS. 17-21 below.

TABLE 10

The layout of exemplary header 1600.

| | |
|---|---|
| R-bit | This bit indicates whether the packet is a request (0) or a response (1). The bit also known as the request/response indicator or RRI for short. |
| N-bit | This bit, which is only valid in response packets (RRI = 1), indicates whether response is positive (0) or negative (1). The bit is also known as the Negative Response Indicator or NRI. |
| T/C Bit | In a negative response (NRI = 1), this bit is called a Terminate Path Indicator or TPI. When set, TPI indicates that the path along the receiving link should be terminated and never used again for this or any other instance of the corresponding request. The response also releases all bandwidth allocated for the request along all paths, and makes that bandwidth available for use by other requests. A negative response that has a "1" in its T-Bit is called a Terminate response. Conversely, a negative response with a "0" in its T-Bit is called a no-Terminate response.<br>In a positive response (NRI = 0), this bit indicates whether the specified path has been committed to by all nodes (1) or not (0). The purpose of a positive response that has a "0" in its C-Bit is to simply acknowledge the receipt of a particular request and to prevent the upstream neighbor from sending further copies of the request. Such a response is called a no-Commit response. |
| F-bit | Flush Indicator. When set, this bit causes the resources allocated on the input link for the corresponding request to be freed, even if the received sequence number doesn't match the last one sent. However, the sequence number should be valid, i.e., the sequence number should fall between FirstReceived and LastSent, inclusive. This bit also prevents the node from sending other copies of the failed request over the input link. |

TABLE 10-continued

The layout of exemplary header 1600.

| | |
|---|---|
| | This bit is reserved and must be set to "0" in all positive responses (NRI = 0). |
| Command | This 4-bit field indicates the type of packet being carried with the header. |
| SequenceNumber | A node and VP unique number that, along with the node and VP IDs, helps identify specific instances of a particular command. |
| Origin | The node ID of the node that originated this packet. |
| Target | The node ID of the node that this packet is destined for. |

The protocol can be configured to use a number of different commands. For example, seven commands may be used with room in the header for 9 more. Table 11 lists those commands and provides a brief description of each, with detailed description of the individual commands following.

TABLE 11

Exemplary protocol commands.

| Command Name | Command Code | Description |
|---|---|---|
| INIT | 0 | Initialize Adjacency |
| HELLO | 1 | Used to implement the Hello protocol (see Section 3 for more details). |
| RESTORE_PATH | 2 | Restore Virtual Path or VP |
| DELETE_PATH | 3 | Delete and existing Virtual Path |
| TEST_PATH | 4 | Test the specified Virtual Path |
| LINK_DOWN | 5 | Used by slave nodes to inform their master(s) of local link failures |
| CONFIGURE | 6 | Used by master notes to configure slave nodes. |
| GET_LSA | 7 | Get LSA information from other nodes |
| CREATE_PATH | 8 | Create Virtual Path |

The Initialization Packet

FIG. 17 illustrates the layout of command specific data for an initialization packet 1700 which in turn causes a START event to be sent to the Hello State Machine of the receiving node. Initialization packet 1700 includes a node ID field 1710, a link cost field 1720, one or more QoS capacity fields (as exemplified by QoS3 capacity (Q3C) field 1730 and a QoSn capacity (QnC) field 1740), a Hello interval field 1750 and a time-out interval field 1760. It should be noted that although certain fields are described as being included in the command-specific data of initialization packet 1700, more or less information could easily be provided, and the information illustrated in FIG. 17 could be sent using two or more types of packets.

The initialization (or INIT) packet shown in FIG. 17 is used by adjacent nodes to initialize and exchange adjacency parameters. The packet contains parameters that identify the neighbor, its link bandwidth (both total and available), and its configured Hello protocol parameters. The INIT packet is normally the first protocol packet exchanged by adjacent nodes. As noted previously, the successful receipt and processing of the INIT packet causes a START event to be sent to the Hello State machine. The field definitions appear in Table 12.

TABLE 12

Field definitions for an initialization packet.

| | |
|---|---|
| NodeID | Node ID of the sending node. |
| LinkCost | Cost of the link between the two neighbors. This may represent distance, delay or any other additive metric. |
| QoS3Capacity | Link bandwidth that has been reserved for QoS3 connection. |
| QoSnCapacity | Link bandwidth that is available for use by all QoS levels (0-3). |
| HelloInterval | The number of seconds between Hello packets. A zero in this field indicates that this parameter hasn't been configured on the sending node and that the neighbor should use its own configured interval. If both nodes send a zero in this field then the default value should be used. |
| HelloDeadInterval | The number of seconds the sending node will wait before declaring a silent neighbor down. A zero in this field indicates that this parameter hasn't been configured on the sending node and that the neighbor should use its own configured value. If both nodes send a zero in this field then the default value should be used. |

The Hello Packet

Figure 18:
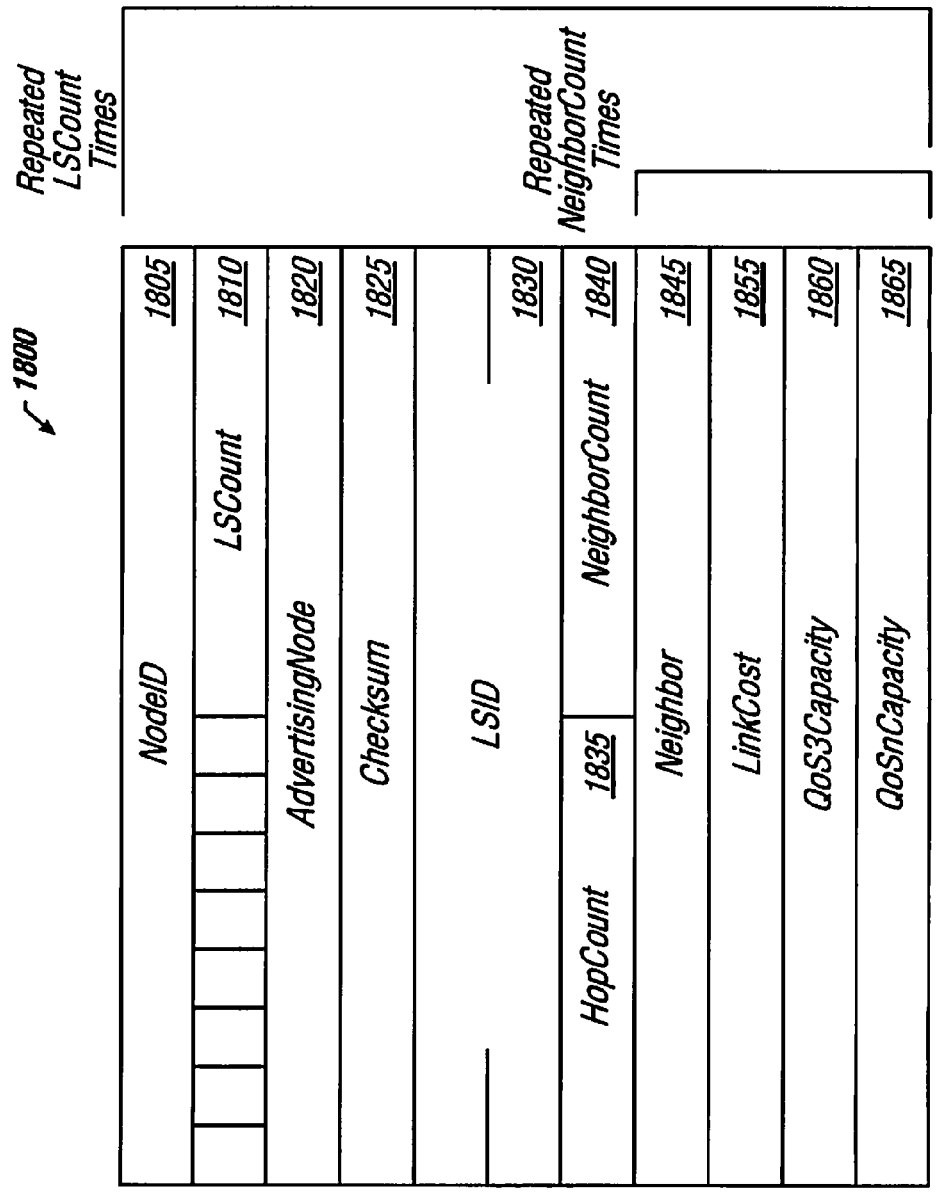
FIG. 18 illustrates the layout of a Hello Packet.

FIG. 18 illustrates the command-specific data for a Hello packet 1800. The command-specific data of Hello packet 1800 includes a node ID field 1805, an LS count field 1810, an advertising node field 1820, a checksum field 1825, an LSID field 1830, a HOP_COUNT field 1835, a neighbor count field 1840, a neighbor node ID field 1845, a link ID field 1850, a link cost field 1855, a Q3C field 1860, and a QnC field 1865.

Hello packets are sent periodically by nodes in order to maintain neighbor relationships, and to acquire and propagate topology information throughout the network. The interval between Hello packets is agreed upon during adjacency initialization. Link state information is included in the packet in several situations, such as when the database at the sending nodes changes, either due to provisioning activity, port failure, or recent updates received from one or more originating nodes. Preferably, only modified LS entries are included in the advertisement. A null Hello packet, also sent periodically, is one that has a zero in its LSCount field and contains no LSAs. Furthermore, it should be noted that a QoSn VP is allowed to use any bandwidth reserved for QoS levels 0 through n. Table 13 describes the fields that appear first in the Hello packet. These fields appear only once.

TABLE 13

Field definitions for the first two fields of a Hello packet.

| | |
|---|---|
| NodeID | Node ID of the node that sent this packet, i.e. our neighbor |
| LSCount | Number of link state advertisements contained in this packet |

Table 14 describes information carried for each LSA and so is repeated LSCount times:

TABLE 14

Field definitions for information carried for each LSA.

| | |
|---|---|
| AdvertisingNode | The node that originated this link state entry. |
| Checksum | A checksum of the LSAs content, excluding fields that node's other than the originating node can alter. |
| LSID | Instance ID. This field is set to FIRST_LSID on the first instance of the LSA, and is incremented for every subsequent instance. |
| Hop_Count | This field is set to 0 by the originating node and is incremented at every hop of the flooding procedure. An LSA with a Hop_Count of MAX_HOPS is not propagated. LSAs with Hop_Counts equal to or greater than MAX_HOPS are silently discarded. |
| NeighborCount | Number of neighbors known to the originating node. This is also the number of neighbor entries contained in this advertisement. |

Table 15 describes information carried for each neighbor and so is repeated NeighborCount times:

TABLE 15

Field definitions for information carried for each neighbor.

| | |
|---|---|
| Neighbor | Node ID of the neighbor being described. |
| LinkCost | Cost metric for this link. This could represent distance, delay or any other metric. |
| QoS3Capacity | Link bandwidth reserved for the exclusive use of QoS3 connections. |
| QoSnCapacity | Link bandwidth available for use by all QoS levels (0-3). |

The GET LSA Packet

Figure 19:
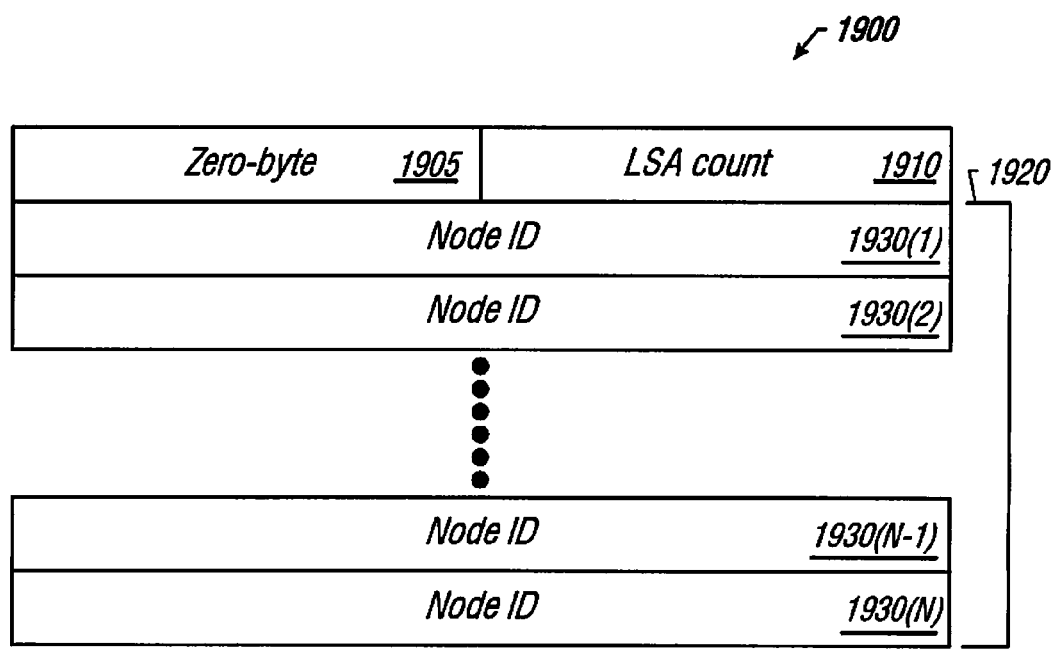
FIG. 19 illustrates the layout of an RPR Packet.

FIG. 19 illustrates the layout of command-specific data for a GET_LSA packet 1900. GET_LSA packet 1900 has its first byte set to zero (exemplified by a zero byte 1905). GET_LSA packet 1900 includes an LSA count 1910 that indicates the number of LSAs being sought and a node ID list 1920 that reflects one or more of the node IDs for which an LSA is being sought. Node ID list 1920 includes node IDs 1930(1)-(N). The GET_LSA response contains a mask that contains a "1" in each position for which the target node possesses an LSA. The low-order bit corresponds to the first node ID specified in the request, while the highest-order bit corresponds to the last possible node ID. The response is then followed by one or more Hello messages that contain the actual LSAs requested.

Table 16 provides the definitions for the fields shown in FIG. 19.

TABLE 16

Field definitions for a GET_LSA packet.

| | |
|---|---|
| Count | The number of node ID's contained in the packet. |
| NodeID0-NodeIDn | The node IDs for which the sender is seeking an LSA. Unused fields need not be included in the packet and should be ignored by the receiver. |

The Restore Path Packet

FIG. 20 illustrates the layout of command-specific data for an RPR packet 2000. RPR packet 2000 includes a virtual path identifier (VPID) field 2010, a checksum field 2020, a path length field 2030, a HOP_COUNT field 2040, and an array of path lengths (exemplified by a path field 2050). Path field 2050 may be further subdivided into hop fields (exemplified by hop fields 2060 (1)-(N), where N may assume a value no larger than MAX_HOPS).

The restore path packet is sent by source nodes (or proxy border nodes), to obtain an end-to-end path for a VP. The packet is usually sent during failure recovery procedures but can also be used for provisioning new VPs. The node sending the RPR is called the origin or source node. The node that terminates the request is called the target or destination node. A Restore Path instance is uniquely identified by its origin and target nodes, and VP ID. Multiple copies of the same restore-path instance are identified by the unique sequence number assigned to each of them. Only the sequence number need be unique across multiple copies of the same instance of a restore-path packet. Table 17 provides the definitions for the fields shown in FIG. 20.

TABLE 17

Field definitions for a Restore Path packet.

| | |
|---|---|
| VPID | The ID of the VP being restored. |
| Checksum | The checksum of the complete contents of the RPR, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path [ ]. Origin node sets the next available entry to 0, and nodes along the path store the link ID of the input link in Path[ ] at PathIndex. PathIndex is then incremented to point to the next available entry in Path [ ]/ Responses: Points to the entry in Path[ ] that corresponds to the link the packet was received on . . . |
| Path[ ] | An array of PathLength link IDs that represent the path between the origin and target nodes. |

The Create Path Packet

FIG. 21 illustrates the layout of command-specific data for a CREATE_PATH (CP) packet 2100. CP packet 2100 includes a virtual path identifier (VPID) field 2110, a checksum field 2120, a path length field 2130, a HOP_COUNT field 2140, and an array of path lengths (exemplified by a path field 2150). Path field 2150 may be further subdivided into hop fields (exemplified by hop fields 2160 (1)-(N), where N may assume a value no larger than MAX_HOPS).

The CP packet is sent by source nodes (or proxy border nodes), to obtain an end-to-end path for a VP. The node sending the CP is called the origin or source node. The node that terminates the request is called the target or destination node. A CP instance is uniquely identified by its origin and target nodes, and VP ID. Multiple copies of the same CP instance are identified by the unique sequence number assigned to each of them. Only the sequence number need be unique across multiple copies of the same instance of a restore-path packet. Table 18 provides the definitions for the fields shown in FIG. 21.

VP after they have received a valid response from the target node. The target node should set the PathIndex field to zero prior to computing the checksum of packet.

The TestPath Packet

The TestPath packet is used to test the integrity of an existing virtual path. The TestPath packet uses the same packet format as the RestorePath packet. The originating node is responsible for initializing the Path [ ], PathLength, and Checksum fields of the packet, which should include the full path of the span being tested. The originating node also sets PathIndex to zero. The target node should set the PathIndex field to zero prior to computing the checksum of packet. The TestPath packet may be configured to test functionality, or may test a path based on criteria chosen by the user, such as latency, error rate, and the like.

The Link-Down Packet

The Link-Down packet is used by slave nodes to inform the master node of link failures, when master nodes are present in

TABLE 18

Field definitions for a Create Path packet.

| | |
|---|---|
| VPID | The ID of the VP being provisioned. |
| Checksum | The checksum of the complete contents of the CP, not including the header. The checksum is normally computed by a target node and verified by the origin node. Tandem nodes are not required to verify or update this field. |
| PathLength | Set to MAX_HOPS on all requests: contains the length of the path (in hops, between the origin and target nodes). |
| PathIndex | Requests: Points to the next available entry in Path [ ]. Origin node sets the next available entry to 0, and nodes along the path store the link ID of the input link in Path[ ] at PathIndex. PathIndex is then incremented to point to the next available entry in Path [ ]/ Responses: Points to the entry in Path[ ] that corresponds to the link the packet was received on . . . |
| Path[ ] | An array of PathLength link IDs that represent the path between the origin and target nodes. |

The Delete Path Packet

The Delete Path packet is used to delete an existing path and releases the existing path's allocated link resources. The Delete Path packet can use the same packet format as the Restore Path packet. The originating node is responsible for initializing the Path [ ], PathLength, and Checksum fields to the packet, which should include the full path of the VP being deleted. The originating node also sets PathIndex to zero. Tandem nodes should release link resources allocated for the the network. This message is provided for instances in which the alarms associated with such failures (AIS and RDI) do not reach the master node.

Centralized Method of Network Management

An extension of the preceding approach is the use of a centralized network management technique according to an embodiment of the present invention. Centralized control can be employed in which a central network node is elected to handle routing and provisioning tasks, such as provisioning connections in a network according to embodiments of the present invention.

Network Startup

In a network employing a centralized method according to embodiments of the present invention, the network's nodes are preferably configured in groups of three or more nodes, and interconnected in a mesh configuration, in a manner such as that described previously with regard to FIG. 2. The nodes form a single distributed system that can span thousands of miles and supports tens of thousands of connections. For such a system to work properly and reliably, there should be a well-defined interface between the nodes, and an agreed upon control hierarchy. Such an interface and hierarchy can be implemented as outlined previously, or may be implemented using a centralized method.

Using a centralized method, one node is designated the master node within each network. This master node is responsible for all path discovery, implementation, assurance, and restoration activities. A second node, preferably one that is geographically diverse from the master node, is assigned the role of the backup node. The backup node is responsible for closely monitoring the master node, and is always ready to take over the master node's responsibilities should the master node fail. The user can also designate one or more nodes as standby nodes. Such nodes act as a second line of defense against failures on the master and backup nodes. In the case where both the master and backup nodes experience failures, the remaining standby node with the highest priority assumes the role of the backup node, should the then-current master node fail.

Figure 22:
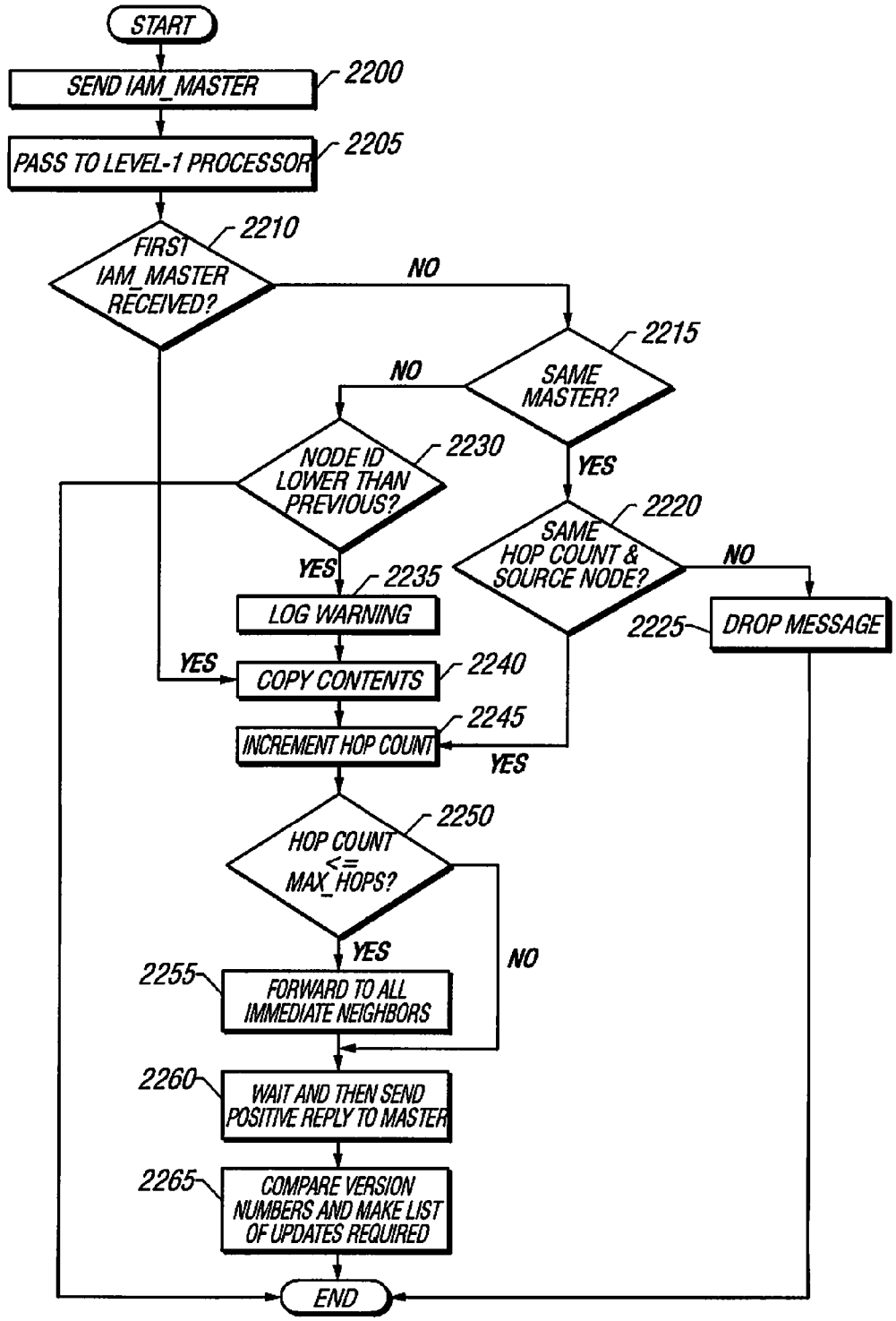
FIG. 22 is a flow diagram illustrating actions performed in a network startup sequence according to one embodiment of the present invention.

FIG. 22 illustrates a flow diagram of a network startup sequence. First, the master node sends an IAM_MASTER message to all of its immediate neighbors (step 2200). The message contains information such as the master's ID, version numbers of all executable images, database ID, and a hop count, which is initially set to zero. When the message arrives at a given node, the message is passed on to the system controller in that node (step 2205). The system controller then performs several tests on the message. If this was not the first IAM_MASTER message received, the system controller determines if the message was received from the same master (step 2215). If so, the system controller then determines if the hop count and source node are the same (step 2220). If they differ (indicating that the IAM_MASTER message is erroneous), the message is dropped (step 2225) and the system controller is finished analyzing the message.

If the master is not the same (step 2215), and the node ID is numerically lower than that of the previous master (step 2230), then the following process occurs. A warning message (indicating that multiple master nodes are operating (multiple masters)) is logged (step 2235). The contents of the message are copied into a local structure, overwriting those of the previous message (step 2240). This is the point to which the process jumps if the IAM_MASTER message received was not the first IAM_MASTER message received. The hop count field of the message is then incremented (step 2245). This is the point to which the process jumps if the hop count and source node of the IAM_MASTER message received was the same as a previous IAM_MASTER message. If the hop count doesn't exceed the maximum allowed (step 2250), the IAM_MASTER message is forwarded to all immediate neighbors (step 2255).

Regardless of the hop count, the system controller then waits for a specified time (e.g., 25 ms×hop-count), and sends a positive reply to the master (step 2260). The reply carries information about the node, such as:

1. Node ID (e.g., the lower 16 bits of the node's serial number)
2. Node type (e.g., backup, normal)
3. System inventory (e.g., from a list of resources maintained by the node)

Finally, the version numbers of all local executable images are compared with those available on the master node, and make a list of all images that need to be updated (step 2265). The list of images created in step 2265 above is then used by the node to update its local copy of the executable images. This may be accomplished, for example, by initiating one or more File Transfer Protocol (FTP) sessions with the master node. FTP, which is a TCP/IP application, is an efficient file transfer protocol that is readily available on most TCP/IP hosts.

At the end of the sequence illustrated in FIG. 22, the master node should have a list of all network resources, and all nodes should have the most recent version of their executable images. The acquired list contains information about whether a given node has routing capabilities, i.e., has a working route processor module. Such nodes automatically assume the role of a standby node, unless they are specifically configured otherwise. The master node assigns the role of the backup node to one of the standby nodes according to Table 19. Once a backup node has been selected for the network, the master node sends the backup node copies of various databases (e.g., the databases containing information regarding the network's topology (the topology database) and information regarding the virtual paths carried by the network), if necessary, and a copy of the resource list (the dynamic database that contains information regarding resources (also referred to herein as the resource database or run-time database).

TABLE 19

Codes for Role of Backup Nodes

| Number of configured backup nodes | Selected backup node |
|---|---|
| 0 | The standby node with the highest-priority (lowest ID) |
| 1 | The one configured as a backup node |
| 2 or more | The backup node with the highest-priority (lowest ID) |

The master node is assumed to have the most up-to-date copy of the database, which is also referred to herein as the authoritative or primary copy. The backup and standby nodes should have a mirror copy of the authoritative database, but this is not assumed unless the authoritative copy is no longer available due to damage or master node failure. Preferably, each version of the database is preferably assigned a unique serial number that allows different versions of the database to be uniquely identified. Such a serial number is normally higher on more recent versions of the same database, simplifying the location and identification of the most recent copy. Serial numbers can be assigned, for example, by the master node, and, in order to implement the preceding paradigm, incremented when the authoritative copy is modified. Changes to secondary copies of the database, by nodes other than the master node, are not usually allowed. When this occurs, however, only the version number of the database should be changed, and not the database's serial number. This allows independent branches of the authoritative copy to be easily tracked and merged. In most cases, however, only the authoritative copy of the database is modified by management agents. Other secondary copies are treated as read-only by their respective nodes.

Database Synchronization

Figure 23:
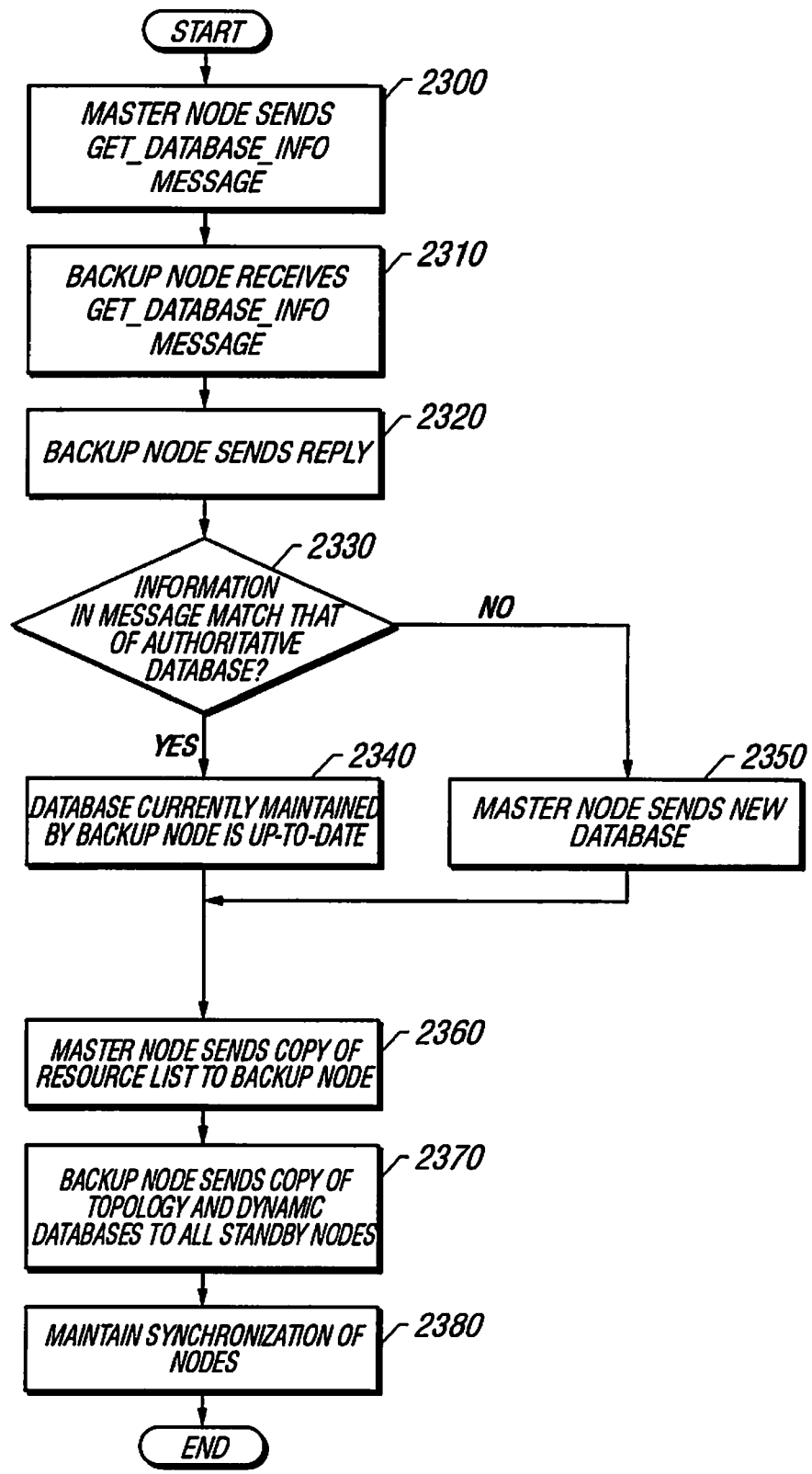
FIG. 23 is a flow diagram illustrating actions performed when synchronizing topology databases according to one embodiment of the present invention.

During network startup, the master, backup, and standby nodes participate in a database synchronization activity that results in a single authoritative copy of the database(s). As depicted in FIG. 23, the sequence starts with the master node sending a message (referred to herein as a GET_DATABASE_INFO message) to the backup node (step 2300). Upon receiving the message (step 2310), the backup node sends back a reply containing the serial and version numbers of the backup node's database(s) (step 2320). The master node uses this information to determine whether a copy of the master node's authoritative database(s) should be sent to that backup node. If the numbers match those of the authoritative database(s) (step 2330), the backup node is assumed to be up-to-date, and no action is taken by the master node (step 2340). If, however, either number differs from that of the authoritative database(s) (step 2330), then a copy of the affected database(s) are sent to the backup node (step 2350).

The next action performed is the master node's sending a copy of the resource list (the dynamic or run-time database, as noted) to the backup node (step 2360). The embedded hierarchy of the resource list is preferably maintained when such a transfer occurs. Once the backup node has been updated, the backup node in turn sends copies of its database(s) (e.g., topology database and dynamic database) to all standby nodes found in the resource list (step 2370). The sequence is similar to the one described above, and so will not be repeated here. Once all nodes have been synchronized, they remain synchronized by messages that inform them of any changes made to the database(s) (e.g., LSA updates for topology changes, and a CreatePath packet for changes to VPs) (step 2380). Furthermore, all user-initiated changes, regardless of where such changes are entered, are handled through the master node, which also updates the backup and standby nodes, before committing the changes to the database(s).

Establishing Multiple Connections

Figure 24:
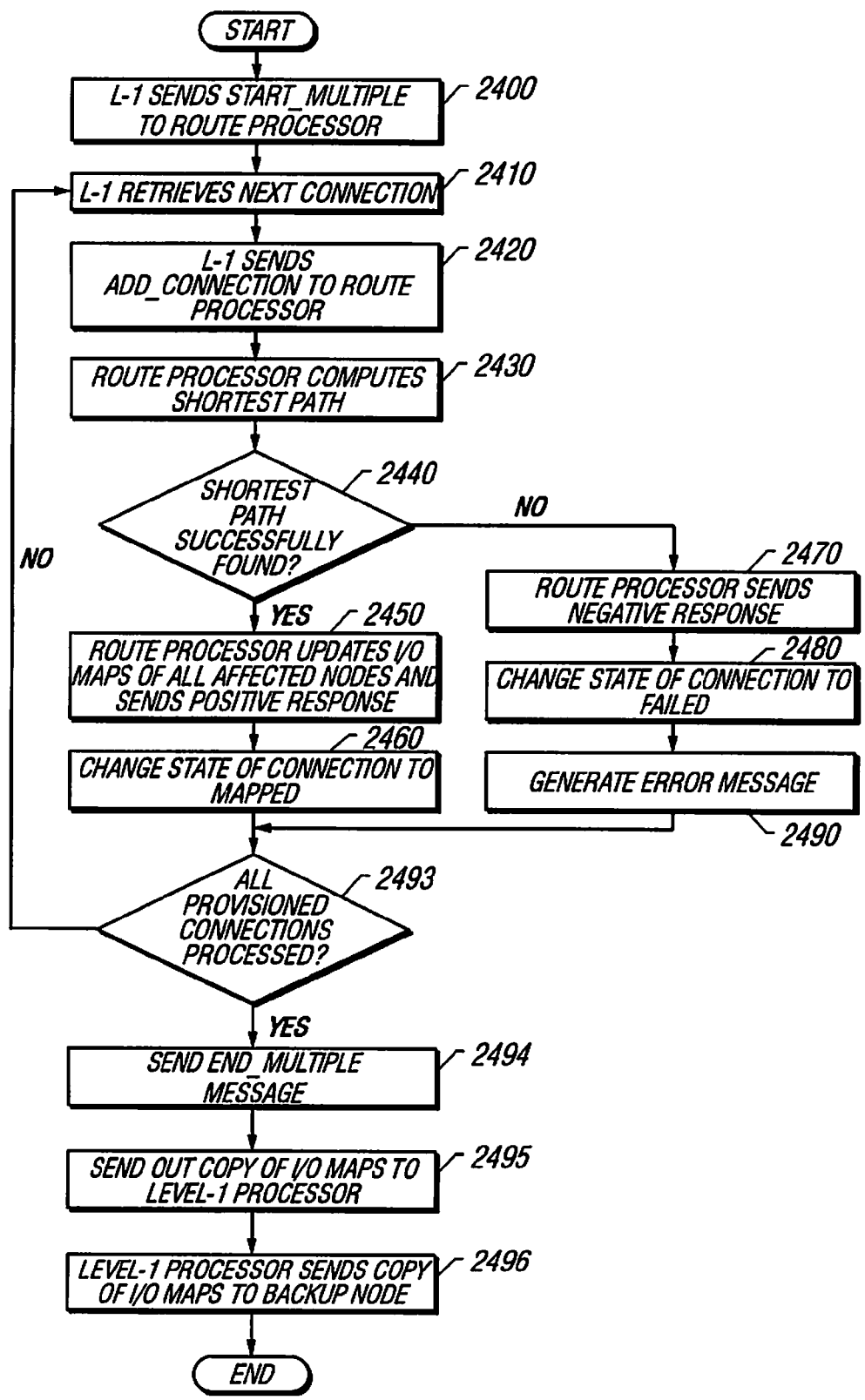
FIG. 24 is a flow diagram illustrating actions performed in the establishment of provisioned connections by a master node according to one embodiment of the present invention.

FIG. 24 illustrates the sequence of actions performed in establishing provisioned connections by a master node. This involves the system controller, which has direct access to the authoritative database, and the route processors, which actually compute, implement, and test the connections. The sequence assumes that connections are listed in a descending QoS.

The process begins with the system controller sending a START_MULTIPLE message to the route processor (step 2400), which causes the route processor to enter batch-processing mode, where configuration requests are deleted until an END_MULTIPLE message is received. The system controller then retrieves the next connection record from the database (step 2410). This should be the highest priority connection of all such remaining connections.

The system controller sends an ADD_CONNECTION message to the route processor (step 2420). The message includes information about the connection such as the following, which may be obtained from the corresponding database record:
1. Source node
2. Destination node
3. Bandwidth
4. QoS Upon receiving the ADD_CONNECTION request, the route processor computes the shortest-path route for the connection, taking into consideration the QoS, bandwidth, and any other parameters specified (step 2430). This may be accomplished, for example, using a method such as the QSPF method described earlier herein, and described more fully in patent application Ser. No. 09/478,235, filed Jan. 4, 2000, and entitled "A Method For Path Selection In A Network," having A. Saleh as inventor, which is hereby incorporated by reference, in its entirety and for all purposes. If the route lookup attempt is successful (step 2440), the route processor then updates the input/output maps of all affected nodes, and sends a positive reply to the system controller (step 2450). A positive reply from the route processor changes the state of the connection to MAPPED (step 2460). If the route lookup attempt fails for any reason (step 2440), the route processor sends back a negative response that carries a reason code explaining the cause of the failure (step 2470). A negative response changes the state of the connection to FAILED (step 2480) and causes an error message to be generated (step 2490).

The system controller continues until all provisioned connections have been processed (step 2493). The system controller then sends an END_MULTIPLE request to the route processor (step 2494), which causes the route processor to send all input/output maps to their respective nodes. The route processor then sends a copy of those maps to the system controller (step 2495), which in turn sends a copy to the backup node (step 2496).

Adding A Connection

Figure 25:
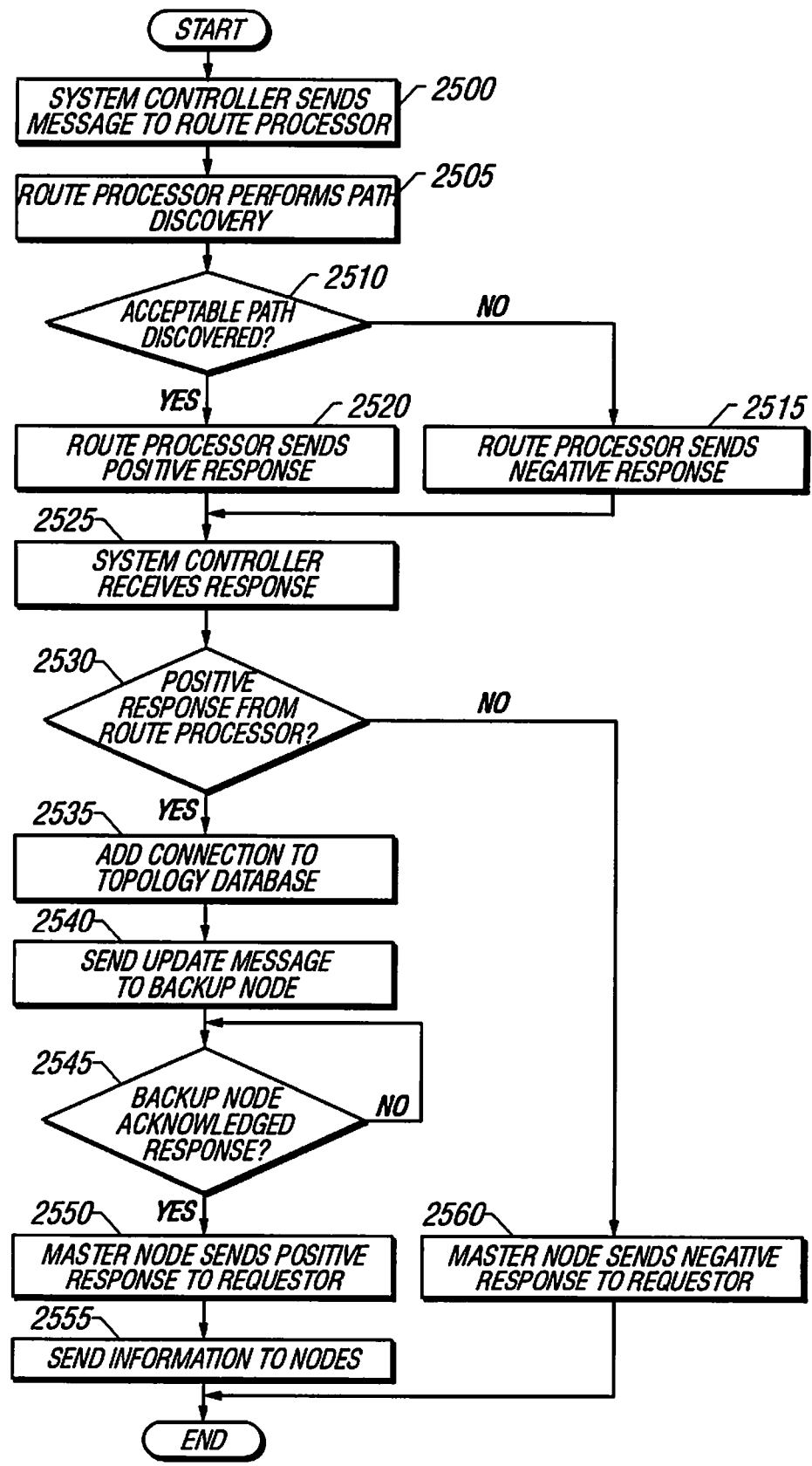
FIG. 25 is a flow diagram illustrating the actions performed in apprising a master node of a change in network topology according to one embodiment of the present invention.

FIG. 25 is a flow diagram illustrating actions performed in adding a network connection in a network according to one embodiment of the present invention. The addition of a connection proceeds in the following manner within the master node. The system controller on the master node begins by sending a message to the master node's route processor requesting a route for the connections (step 2500). The route processor uses the specified source node, destination node, bandwidth, QoS and other parameters to find the shortest-path route between the two nodes using the algorithms discussed earlier (step 2505). If the path discovery attempt fails (step 2510), the route processor sends back a negative response indicating the cause of the failure (step 2515). However, if successful (step 2510), the route processor sends a positive response to the system controller (step 2520) that carries information such as the following:
1. An ordered list of hops that represent the path between the source and destination nodes.
2. The connection ID, which is a unique identifier that identifies the connection within the network.

Upon receiving the response from the route processor (step 2525), the system controller does one of two things, depending on the result of the operation (step 2530). A positive response causes the connection to be added to the database (step 2535), and an update message to be sent to the backup node (step 2540). Once the backup node has acknowledged the receipt of the information (step 2545), the master node then sends a positive response to the original sender of the request (step 2550). The new information (e.g., I/O maps) is also propagated to the other nodes (step 2555). A negative response from the route processor causes the master node to reject the request by returning a negative response to the original sender (step 2560).

Deleting a Connection

Figure 26:
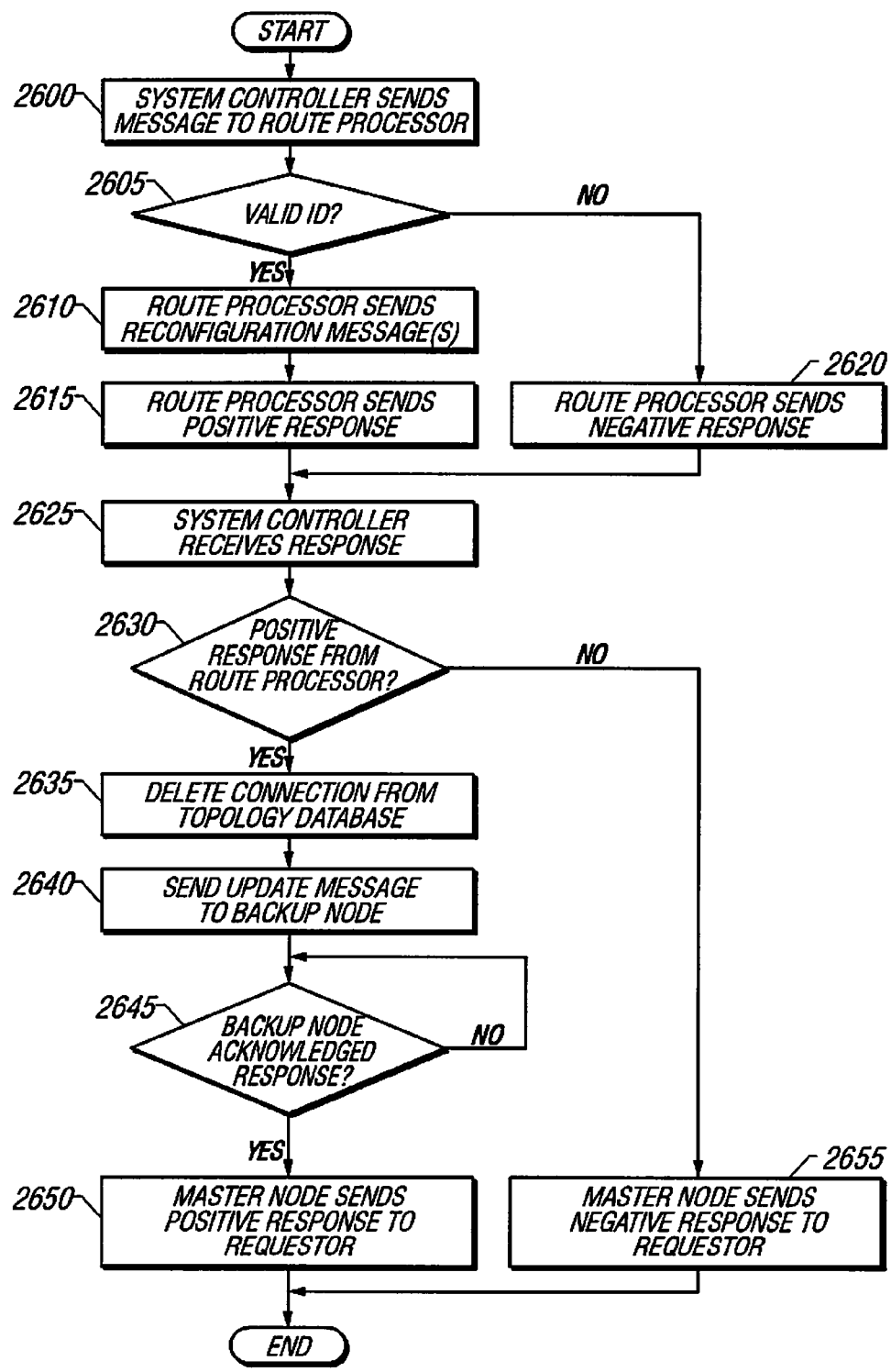
FIG. 26 is a flow diagram illustrating actions performed in adding a network connection in a network according to one embodiment of the present invention.

FIG. 26 is a flow diagram illustrating actions performed in deleting a network connection in a network according to one embodiment of the present invention. The deletion of a connection proceeds within the master node in a similar fashion.

First, the system controller on the master node sends a message to the master node's route processor requesting the deletion of the connection from the route processor's topology database (step 2600). The only parameter that need be supplied is the connection ID, which is assigned and returned by the route processor when a connection is first established. If the specified ID is valid (step 2605), the route processor sends one or more reconfiguration messages to all nodes along the path of the connection, including the source and destination nodes (step 2610). The route processor then sends a positive response to the system controller, without any further action required of the route processor (step 2615). Otherwise, the route processor then sends a negative response to the system controller, indicating that the deletion could not be performed (step 2620).

Upon receiving the response from the route processor (step 2625), the system controller does one of two things, depending on the result of the operation (step 2630). A positive response causes the connection to be removed from the database (step 2635), and an update message to be sent to the backup node (step 2640). Once the backup node has acknowledged the receipt of the information (step 2645), the master mode sends a positive response to the original sender of the request (step 2650). A negative response from the route processor causes the master node to reject the request by returning a negative response to the requestor (step 2655).

Restoration of Connections

Figure 27:
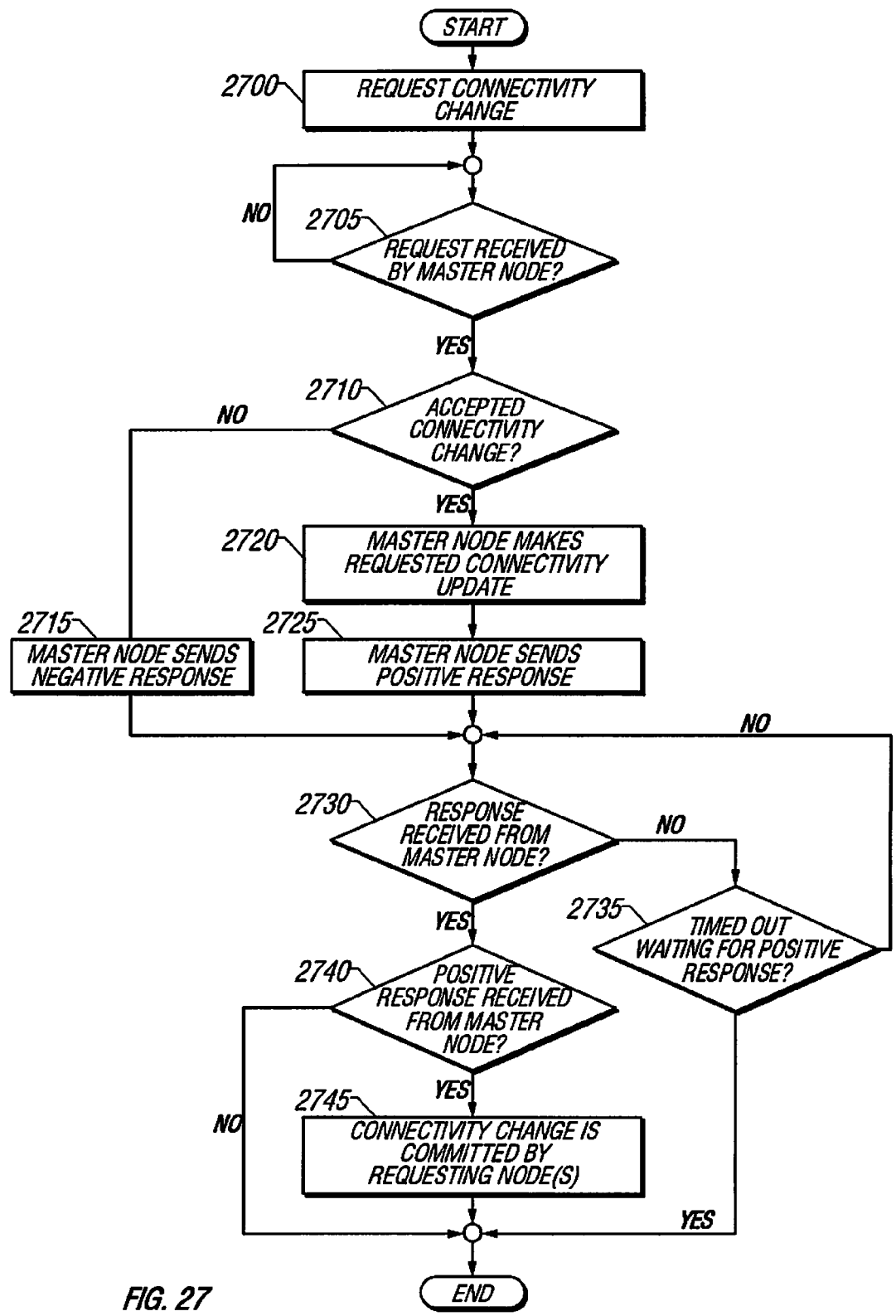
FIG. 27 is a flow diagram illustrating actions performed in deleting a network connection in a network according to one embodiment of the present invention. The use of the same reference symbols in different drawings indicates similar or identical items.

FIG. 27 is a flow diagram illustrating the actions performed in apprising the master node of a change in network topology. When a change is made to the network (either by a user, or in response to a failure), a request is sent to the master node for verification (step 2700). Upon receiving the request (step 2705), the master node determines whether the requested change is acceptable, given the current state of the network, available services, the services requested, and the like (step 2710). This information can be determined using any one of a number of techniques. For example, a broadcast technique such as that disclosed herein (and even more fully described in the patent application entitled "A METHOD FOR ROUTING INFORMATION OVER A NETWORK," as previously incorporated by reference herein) can be employed. If the requested change is not acceptable, the master node sends a negative response to the requestor (step 2715). If, however, the requested change is acceptable, the master node makes the requested connectivity updates, adding, deleting, and altering connections as necessary to accommodate the request (step 2720). Using the broadcast technique discussed above, the master node sends a notification to the given VP's source node, for example, to initiate the identification of the new physical path. The master node also sends a positive response to the requestor (step 2725).

While the above processing is performed, the requesting node(s) await the master node's response (step 2730), and continue to do so, unless some reason for reconsidering the transaction exists (e.g., a timeout condition occurs) (step 2735). Thus, the connectivity change is not committed until a positive response is received from the master node (steps 2740 and 2745), with a negative response resulting in the connectivity change being abandoned. In certain embodiments of the present invention, changing connections is merely a combination of adding and dropping the appropriate connections across various links. Within the master node, several actions are performed in determining the viability of a connectivity change, and maintaining topology information in the face of such changes, as previously discussed.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for adding a path in a network, wherein said network comprises a plurality of nodes, comprising:
performing path discovery at a master node, wherein
each of said nodes is communicatively coupled to another of said nodes by at least one of a plurality of optical links,
said path discovery is performed by a route processor associated with said master node,
said path discovery is performed to identify said path, and
said path is between a source node of said nodes and a destination node of said nodes; and
if said path is successfully discovered,
adding said path to a topology database,
sending an update message to a backup node, said update message comprising information regarding said path, and
sending a positive response from said route processor to a system controller of said master node, if said path is successfully discovered.

2. The method of claim 1, wherein said backup node and said master node are ones of said nodes.

3. The method of claim 1, wherein said positive response comprises:
an ordered list of hops, wherein said ordered list of hops represents said path, and said path is between said source and said destination nodes; and
a connection identifier, wherein said connection identifier uniquely identifies said path within said network.

4. The method of claim 3, further comprising:
sending another positive response to said requestor, if said positive response is received by said system controller; and
sending a negative response to said requestor, otherwise.

5. The method of claim 1, further comprising:
sending information regarding said path to others of said nodes, if said path is successfully discovered.

6. The method of claim 5, wherein each of said others of said nodes is a standby node.

7. The method of claim 5, wherein said information regarding said path comprises an I/O map.

8. The method of claim 5, further comprising:
communicating a reconfiguration message to ones of said nodes, said path comprising said ones of said nodes, if said path is successfully discovered.

9. A method for deleting a path in a network, wherein said network comprises a plurality of nodes, comprising:
receiving a deletion request at a route processor of a master node, wherein
said deletion request comprises a connection identifier,
said connection identifier identifies said path,
said path is between a source node of said nodes and a destination node of said nodes
said path comprising a plurality of said nodes,
said plurality of said nodes comprises said source and said destination nodes, and each of said nodes is communicatively coupled to another of said nodes by at least one of a plurality of optical links;
communicating a reconfiguration message to each of said plurality of said nodes;
determining if said path is successfully deleted; and
if said path is successfully deleted,
deleting said path from a topology database, and
sending a positive response from said route processor to a system controller of said master node.

10. The method of claim 9, further comprising:
sending an update message to a backup node, said update message comprising information regarding said path, if said path is successfully deleted.

11. The method of claim 10, wherein said backup node and said master node are ones of said nodes.

12. The method of claim 10, further comprising:
determining if said connection identifier is valid; and
sending a negative response from said route processor to a system controller of said master node, if said connection identifier is not valid.

13. The method of claim 9, further comprising:
sending another positive response to said requestor; if said positive response is received by said system controller, and
sending a negative response to said requestor, otherwise.

14. The method of claim 9, further comprising:
communicating a reconfiguration message to ones of said nodes, said path comprising said ones of said nodes, if said path is successfully deleted.

15. A method for changing a path in a network, wherein said network comprises a plurality of nodes, comprising:
receiving a connectivity change request at a master node, wherein
said path is between a source node of said nodes and a destination node of said nodes
said path comprising a plurality of said nodes,
said plurality of said nodes comprises said source and said destination nodes, and
each of said nodes is communicatively coupled to another of said nodes by at least one of a plurality of optical links;
determining if ones of said nodes affected by said connectivity change request can be configured to effect said connectivity change request, wherein
said determining comprises
initiating the identification of a new physical path from said source node by sending a notification from said master node to said source node; and
updating a topology database to reflect a change in said path effected by said connectivity change request, if said ones of said nodes affected by said connectivity change request can be configured to effect said connectivity change request.

16. The method of claim 15, wherein said determining is based on at least one of:
a current state of said network,
a service available in said network, and
a service requested in said connectivity change request.

17. The method of claim 15, wherein
said connectivity change request comprises a connection identifier, and
said connection identifier identifies said path.

18. The method of claim 15, further comprising:
sending an update message to a backup node, said update message comprising information regarding said path, if said ones of said nodes affected by said connectivity change request can be configured to effect said connectivity change request.

19. The method of claim 18, wherein said backup node and said master node are ones of said nodes.

20. The method of claim 15, further comprising:
communicating a reconfiguration message to said ones of said nodes affected by said connectivity change request, if said ones of said nodes affected by said connectivity change request can be configured to effect said connectivity change request.

21. The method of claim 20, further comprising:
committing a connectivity change requested in said connectivity change request, if said ones of said nodes affected by said connectivity change request can be configured to effect said connectivity change request.

22. The method of claim 15, further comprising:
sending a positive response from said master node, if said ones of said nodes affected by said connectivity change request can be configured to effect said connectivity change request.

23. The method of claim 22, further comprising:
communicating a reconfiguration message to said ones of said nodes affected by said connectivity change request, if said master node sends a positive response.

24. The method of claim 23, further comprising:
committing a connectivity change requested in said connectivity change request, if said master node sends a positive response.

* * * * *